United States Patent
Young et al.

(10) Patent No.: US 11,418,297 B2
(45) Date of Patent: Aug. 16, 2022

(54) SYSTEMS AND METHODS INCLUDING WIRELESS DATA PACKET RETRANSMISSION SCHEMES

(71) Applicant: Bose Corporation, Framingham, MA (US)

(72) Inventors: Douglas Warren Young, Arlington, MA (US); Rasmus Abildgren, Skørping (DK); Casper Stork Bonde, Støvring (DK)

(73) Assignee: Bose Corporation, Framingham, MA (US)

( * ) Notice: Subject to any disclaimer, the term of this patent is extended or adjusted under 35 U.S.C. 154(b) by 150 days.

(21) Appl. No.: 16/835,919

(22) Filed: Mar. 31, 2020

(65) Prior Publication Data

US 2021/0306103 A1 Sep. 30, 2021

(51) Int. Cl.
*H04L 1/18* (2006.01)
*H04W 4/80* (2018.01)
*H04R 1/10* (2006.01)

(52) U.S. Cl.
CPC .......... *H04L 1/189* (2013.01); *H04R 1/1016* (2013.01); *H04W 4/80* (2018.02); *H04R 2420/07* (2013.01)

(58) Field of Classification Search
CPC ....... H04L 1/189; H04L 1/22; H04L 65/4076; H04L 1/08; H04L 1/0061; H04L 1/0071; H04W 4/80; H04W 4/008
See application file for complete search history.

(56) References Cited

U.S. PATENT DOCUMENTS

| 10,341,758 B1 | 7/2019 | Tong et al. |
| 10,757,466 B2* | 8/2020 | Lau .................. H04N 21/26233 |
| 2017/0142535 A1* | 5/2017 | Aggarwal ........... H04L 65/4092 |
| 2018/0084456 A1 | 3/2018 | Gostev et al. |
| 2020/0252162 A1* | 8/2020 | Denboer ............. H04W 12/106 |

FOREIGN PATENT DOCUMENTS

WO 2019129748 A1 7/2019

OTHER PUBLICATIONS

International Search Report and the Written Opinion of the International Searching Authority, International Patent Application No. PCT/US2021/024417, pp. 1-11, dated Jul. 5, 2021.

* cited by examiner

*Primary Examiner* — Iqbal Zaidi
(74) *Attorney, Agent, or Firm* — Bond, Schoeneck & King, PLLC

(57) ABSTRACT

An audio system and method for retransmission of data packets between audio devices. The audio system includes a source device, a first audio device and a second audio device configured to receive an isochronous data stream from the source device. Each audio device is configured to eavesdrop or otherwise monitor the packets within the isochronous data stream meant for each of the audio devices and each audio device can retransmit packets from one audio device to the other in the event one audio device fails to receive a packet. The audio system is configured to operate in at least a partial retransmission mode or a total retransmission mode where the partial retransmission mode allows each audio device to selectably retransmit packets between audio devices and where the total retransmission mode requires one audio device to retransmit all packets to the other audio device.

24 Claims, 9 Drawing Sheets

SYSTEMS AND METHODS INCLUDING WIRELESS DATA PACKET RETRANSMISSION SCHEMES

BACKGROUND

Aspects and implementations of the present disclosure are generally directed to systems and methods for broadcasting and receiving wireless audio data streams, for example, broadcasting and receiving wireless audio data streams between wireless devices.

Wearable wireless audio devices, e.g., wireless headphones, often utilize paired connections to stream wireless audio data from a source device. Typically, each wireless headphone receives a discrete stream of data specific to each wireless headphone, e.g., the source device produces two streams of data, one to the left headphone and one to the right headphone. A user, after placing each wireless audio device within or in proximity to their respective ears, may place the source device in a location that compromises the path of transmission of one of the data streams. For example, the user may place the source device in their right side or right-back pocket such that the path of transmission to the left headphone is obstructed by a substantial portion of the user's body. This "cross-body" problem results in a low quality data link between the source device and the left headphone leading to unacceptable data losses.

SUMMARY OF THE DISCLOSURE

The present disclosure relates to systems and methods for retransmission of data packets between audio devices. The audio system includes a source device, and a first audio device and a second audio device configured to receive an isochronous data stream from the source device. Each audio device is configured to eavesdrop or otherwise monitor the packets within the isochronous data stream meant for each of the audio devices, and each audio device can retransmit packets from one audio device to the other in the event that one of the audio devices fails to receive a packet. The audio system is configured to operate in at least a partial retransmission mode or a total retransmission mode where the partial retransmission mode allows each audio device to selectably retransmit packets between audio devices and where the total retransmission mode requires one audio device to retransmit all packets to the other audio device. In one example, the audio system is configured to switch into the partial retransmission mode or the total retransmission mode based on a determined link quality between each device.

The present disclosure utilizes wireless audio transmission and retransmission schemes, specifically, wireless topologies for broadcasting and transmitting audio streams between devices. For example, Core Specification 5.2 released by the Bluetooth Special Interest Group (SIG) on Jan. 6, 2020, defines new features related to Bluetooth Low Energy (BLE) topologies. One feature described in the 5.2 Core Specification is Broadcast Isochronous Streams which utilize connectionless isochronous communications. A similar feature described by the 5.2 Core Specification is an LE Connected Isochronous Stream, which utilizes connection-oriented isochronous channels to provide a point-to-point isochronous communication stream between two devices, e.g., between source device 102 and audio devices 104 and 106 (discussed below). As will be described below in detail, the present application is related to systems, devices, and methods to provide a user of a compatible device, with methods of interacting with isochronous communications of source devices, e.g., source device 102 and/or the other audio devices in the system. In one example, the systems, devices, and methods discussed herein utilize Bluetooth Low-Energy audio topologies enabled by the 5.2 Core Specification (referred to herein as "LE Audio"). LE Audio typically utilizes lower energy consumption than traditional or classic Bluetooth connections. Additionally, unlike Bluetooth classic, LE Audio may utilize Low Complexity Communication Codec (referred to as "LC3") which compresses audio data for transmission through the air. Unlike Bluetooth Classic's Low-Complexity Subband codec (SBC codec), LC3 scales down to very low bit rates, e.g., 160 kbps, which helps ensure that audio data successfully sends over the bandwidth of LE Audio connections.

For example, Bluetooth Low-Energy (BLE), or LE Audio, enables unicast wireless topologies (referred to as "connected isochronous streams") that allow a single Bluetooth audio source (e.g., a smart phone) to transmit multiple audio streams to separate Bluetooth devices at the same time, e.g., wireless headphones. These topologies are intended to improve Bluetooth operation for wireless headphones, but in some situations can make reception of audio data worse. For example, in a cross-body situation, the user may place their phone in their pocket which is transmitting audio packets to each headphone in each of the user's ears. In this situation, one of the two headphones will always be cross-body which is very challenging for reliable radio frequency communications. The present disclosure provides a solution to this situation in that packets may be retransmitted between headphones rather than only from the source device to each headphone respectively.

Additionally, alternative LE Audio topologies may utilize a broadcast isochronous stream topology that allows Bluetooth devices to "listen in" on broadcasted audio streams in, e.g., public places such as in airports, gyms, sports bars, malls, atriums, etc. One of the challenges in utilizing a broadcast isochronous stream topology is that broadcast audio packets are not acknowledged by receiving devices. The present disclosure offers solutions to broadcast topologies as well, in that, in place of acknowledgements, the audio system can retransmit packets between headphones directly to decrease or minimize data loss.

In one example, an audio system is provided, the audio system including a first audio device comprising first circuitry configured to wirelessly receive at least a portion of an isochronous data stream from a source device, the isochronous data stream including a first audio stream configured to be rendered by the first audio device, and a second wireless audio device comprising second circuitry configured to selectably receive one or more packets of the first audio stream from the isochronous data stream, wherein the second circuitry of the second audio device is arranged to wirelessly transmit one or more retransmission packets to the first audio device, and wherein the one or more retransmission packets are based on the one or more packets of the first audio stream.

In an aspect, the second circuitry of the second audio device is arranged to monitor whether the first circuitry receives the first packet, and, if the first circuitry does not receive the first packet, the second circuitry is arranged to wirelessly transmit the one or more retransmission packets to the first audio device.

In an aspect, the second circuitry of the second audio device is configured to acknowledge or receive an acknowledgment during a first subinterval of the isochronous data stream that indicates that a first packet of the one or more packets was received by the first circuitry of the first audio device; or, the second circuitry of the second audio device is configured to acknowledge or receive a negative acknowledgement during the first subinterval of the isochronous data stream that indicates that the first packet was not received by the first circuitry of the first audio device.

In an aspect, if the second circuitry receives a negative acknowledgment indicating that the first packet was not received by the first circuitry of the first audio device, the second circuitry is further configured to transmit a first retransmission packet of the one or more retransmission packets to the first circuitry of the first audio device during a marginal subinterval of the isochronous data stream, the first retransmission packet being a copy of the first packet.

In an aspect, the isochronous data stream includes the first subinterval and a first repeat subinterval after the first subinterval, wherein during the first subinterval the source device is configured to transmit the first packet at a first frequency and during the first repeat subinterval the source device is arranged to transmit a first repeat packet associated with the first packet at a second frequency and the second circuitry of the second audio device is arranged to transmit a first retransmission packet of the one or more retransmission packets to the first circuitry of the first audio device at the first frequency or at a third frequency different than the first frequency and the second frequency.

In an aspect, the first circuitry of the first audio device and the second circuitry of the second audio device are configured to receive and render the at least a portion of the isochronous data stream from the source device, the isochronous data stream further comprising a second packet of the one or more packets of the first audio stream associated with the second audio device, wherein the first circuitry of the first audio device is arranged to monitor whether the second circuitry receives the second packet, and, if the second circuitry does not receive the second packet, the first circuitry is arranged to transmit a second retransmission of the one or more retransmission packets to the second audio device, the second retransmission packet associated with the second packet.

In an aspect, the first circuitry of the first audio device is configured to acknowledge or receive an acknowledgment during a second subinterval of the isochronous data stream that indicates that the second packet was received by the second circuitry of the second audio device; or, the first circuitry of the first audio device is configured to acknowledge or receive a negative acknowledgement during the second subinterval of the isochronous data stream that indicates that the second packet was not received by the second circuitry of the second audio device.

In an aspect, if the first circuitry receives a negative acknowledgment indicating that the second packet was not received by the second circuitry of the second audio device, the first circuitry is further configured to transmit the second retransmission packet to the second circuitry of the second audio device during a marginal subinterval of the isochronous data stream, the second retransmission packet being a copy of the second packet.

In an aspect, the isochronous data stream includes the second subinterval and a second repeat subinterval after the second subinterval, wherein during the second subinterval the source device is configured to transmit the second packet at a first frequency and during the second repeat subinterval the source device is arranged to transmit a second repeat packet associated with the second packet at a second frequency and the first circuitry of the first audio device is arranged to transmit the second retransmission packet to the second circuitry of the second audio device at the first frequency or at a third frequency different than the first frequency and the second frequency.

In an aspect, the isochronous data stream is a broadcast isochronous stream or a connected isochronous stream over a Bluetooth Low-Energy protocol.

In an aspect, the one or more retransmission packets are transmitted between the first circuitry and the second circuitry using Near-Field Magnetic Inductance (NFMI) connection or a Low Energy Asynchronous Connection (LE ACL) logical transport protocol.

In an aspect, the one or more packets include an access code and the first audio device, and the second audio device are arranged to receive the access code.

In an aspect, each of the one or more retransmission packets are encoded with forward error correction data to increase the probability of receipt by the first circuitry of the first audio device.

In an aspect, the second circuitry is configured to selectably receive a first packet of the one or more packets based at least in part on: (i) a link quality between the first audio device and the source device; (ii) the link quality between the second audio device and the source device; or, (iii) the link quality between the first audio device and the second audio device.

In another example, a method for audio retransmission is provided, the method including receiving, via first circuitry of a first audio device, at least a portion of an isochronous data stream from a source device, the isochronous data stream including a first audio stream associated with the first audio device; receiving, via second circuitry of a second audio device, the one or more packets of the first audio stream from the isochronous data stream; transmitting one or more retransmission packets, via the second circuitry of the second audio device, to the first circuitry of the first audio device, wherein the one or more retransmission packets are based on the one or more packets.

In an aspect, the transmitting of the one or more retransmission packets, via the second circuitry, only occurs if the first circuitry does not receive the one or more packets.

In an aspect, the method further includes: receiving, via the second circuitry of the second audio device, an acknowledgment during a first subinterval of the isochronous data stream to indicate that a first packet of the one or more packets was received by the first circuitry of the first audio device; or, receiving, via the second circuitry of the second audio device, a negative acknowledgement during the first subinterval of the isochronous data stream to indicate that the first packet was not received by the first circuitry of the first audio device.

In an aspect, the method further includes: transmitting, via the second circuitry, a first retransmission packet of the one or more retransmission packets to the first circuitry of the first audio device during a marginal subinterval of the isochronous data stream, the first retransmission packet being a copy of the first packet, if the second circuitry receives the negative acknowledgment indicating that the first packet was not received by the first circuitry of the first audio device.

In an aspect, the isochronous data stream includes the first subinterval and a first repeat subinterval after the first subinterval, wherein the first packet is transmitted at a first frequency and during the first subinterval; the source device transmits a first repeat packet associated with the first packet at a second frequency different than the first frequency during the first repeat subinterval; and the second circuitry of the second audio device is configured to transmit a first retransmission packet of the one or more retransmission packets to the first circuitry of the first audio device at the first frequency or at a third frequency different than the first frequency and the second frequency.

In an aspect, the isochronous data stream is a broadcast isochronous stream or a connected isochronous stream over a Bluetooth Low-Energy protocol.

In an aspect, the one or more retransmission packets are transmitted between the first circuitry and the second circuitry using Near-Field Magnetic Inductance (NFMI) connection or a Low Energy Asynchronous Connection (LE ACL) logical transport protocol.

In an aspect, the one or more packet includes an access code and the method further includes: receiving the access code via the first circuitry of the first audio device and the second circuitry of the second audio device.

In an aspect, the one or more retransmission packets are encoded with forward error correction data to ensure receipt by the first circuitry of the first audio device.

In an aspect, the second circuitry is configured to selectably receive a first packet of the one or more packets based at least in part on: (i) a link quality between the first audio device and the source device; (ii) the link quality between the second audio device and the source device; or, (iii) the link quality between the first audio device and the second audio device.

In a further example, an audio system is provided, the audio system including a first audio device comprising first circuitry, wherein in a first mode, the first circuitry is configured to wirelessly receive from a source device at least a first portion of an isochronous data stream relating to a first audio stream that is intended to be rendered by the first audio device; and a second audio device comprising second circuitry, wherein in the first mode, the second circuitry is configured to wirelessly receive from the source device at least a second portion of the isochronous data stream relating to a second audio stream that is intended to be rendered by the second audio device, the second audio stream different from the first audio stream; wherein, in response to a trigger, a second mode is enabled such that the second audio device is configured to: (i) wirelessly receive from the source device one or more packets of the isochronous data stream relating to the first audio stream and (ii) wirelessly transmit the one or more packets of the first audio stream to the first audio device.

In an aspect, the trigger can be selected from: a signal strength or link quality of one of the devices exceeding a threshold (e.g., the second audio device has a high signal strength or high link quality); a signal strength or link quality of one of the devices (first audio device or second audio device) dropping below a threshold (e.g., the first audio device has a low signal strength or low link quality); the first audio device failing to receive a threshold amount of packets; the second audio device failing to receive a threshold amount of packets; the second audio device receiving a packet request from the first audio device; a discrepancy based on eavesdropping on the first audio device's ACKs/NACKs (e.g., seeing a threshold number of NACKs in a given time period from the first audio device to the source device or a threshold number of NACKs in a row); a sensor input (e.g., the audio system automatically switches modes based on location of the first audio device, the second audio device, or the source device, knowing it will be a challenged RF space, such as a user's workplace); or user input to switch to the second mode manually.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

The present disclosure relates to systems and methods for retransmission of data packets between audio devices. The audio system includes a source device, and a first audio device and a second audio device configured to receive an isochronous data stream from the source device. Each audio device is configured to eavesdrop or otherwise monitor the packets within the isochronous data stream meant for each of the audio devices, and each audio device can retransmit packets from one audio device to the other in the event that one of the audio devices fails to receive a packet. The audio system is configured to operate in at least a partial retransmission mode or a total retransmission mode where the partial retransmission mode allows each audio device to selectably retransmit packets between audio devices and where the total retransmission mode requires one audio device to retransmit all packets to the other audio device. In one example, the audio system is configured to switch into the partial retransmission mode or the total retransmission mode based on a determined link quality between each device.

The term "wearable audio device", as used in this application, in addition to including its ordinary meaning or its meaning known to those skilled in the art, is intended to mean a device that fits around, on, in, or near an ear (including open-ear audio devices worn on the head or shoulders of a user) and that radiates acoustic energy into or towards the ear. Wearable audio devices are sometimes referred to as headphones, earphones, earpieces, headsets, earbuds or sport headphones, and can be wired or wireless.

Figure 1:
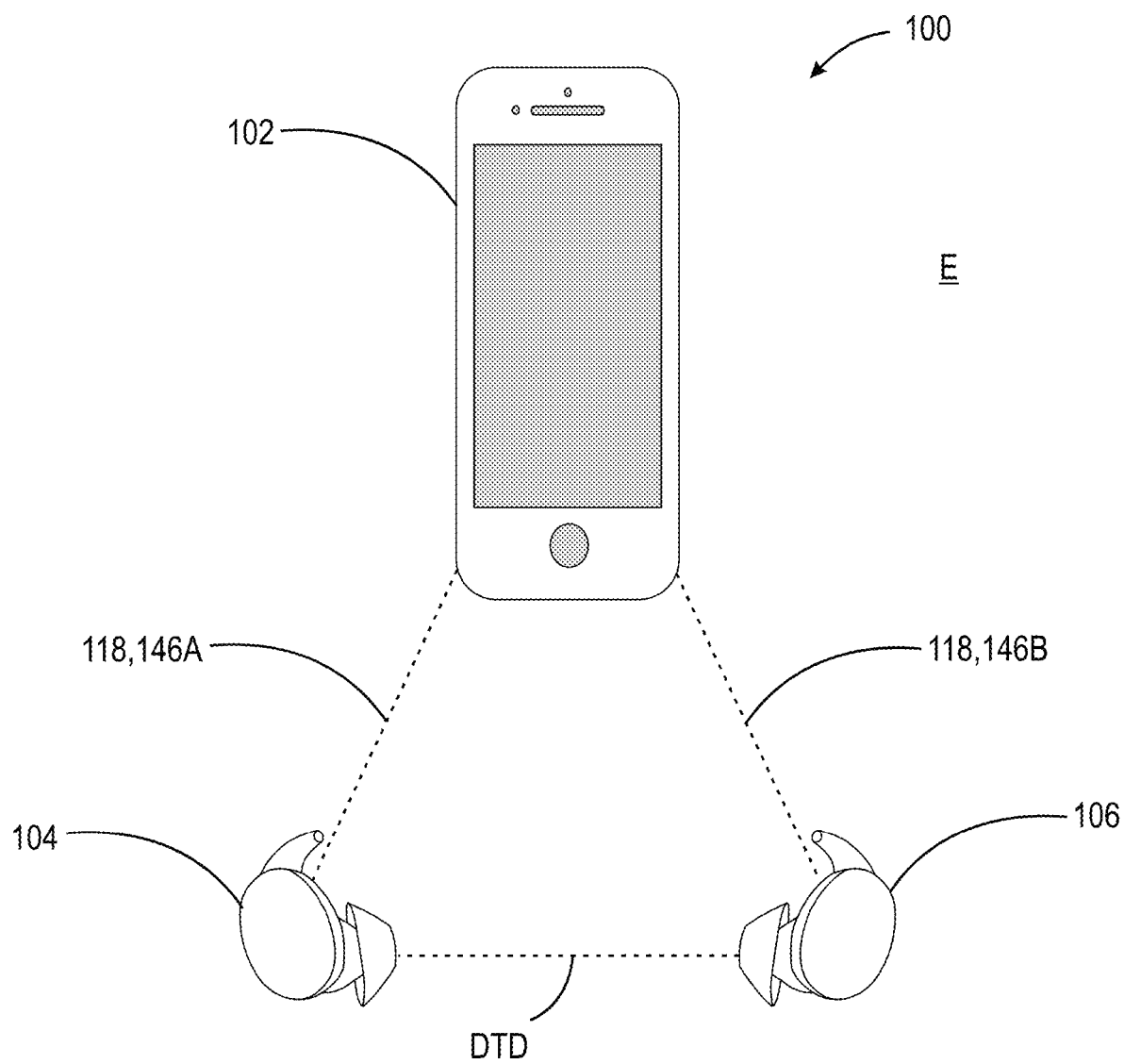
FIG. 1 is a schematic view of an audio system according to the present disclosure.

A wearable audio device includes an acoustic driver to transduce audio signals to acoustic energy. The acoustic driver can be housed in an earcup. While some of the figures and descriptions following can show a single wearable audio device, having a pair of earcups (each including an acoustic driver) it should be appreciated that a wearable audio device can be a single stand-alone unit having only one earcup. Each earcup of the wearable audio device can be connected mechanically to another earcup or headphone, for example by a headband and/or by leads that conduct audio signals to an acoustic driver in the ear cup or headphone. A wearable audio device can include components for wirelessly receiving audio signals. A wearable audio device can include components of an active noise reduction (ANR) system. Wearable audio devices can also include other functionality such as a microphone so that they can function as a headset. While FIG. 1 shows an example of an in-the-ear headphone form factor, in other examples the wearable audio device can be an on-ear, around-ear, over-the-ear or near-ear headset, or can be an audio eyeglasses form factor headset. In some examples, the wearable audio device can be an open-ear device that includes an acoustic driver to radiate acoustic energy towards the ear while leaving the ear open to its environment and surroundings.

Figure 4:
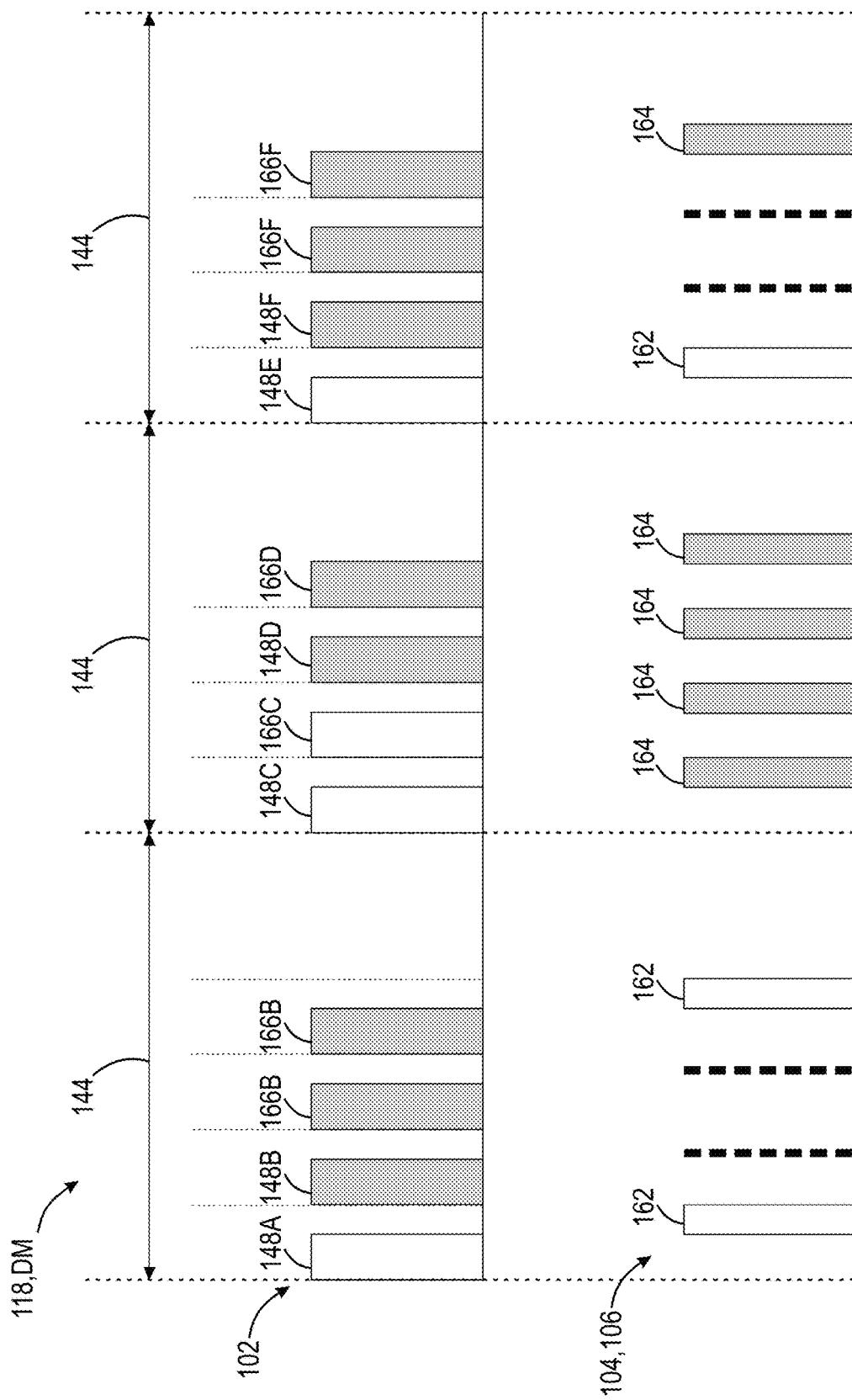
FIG. 4 illustrates a schematic view of an isochronous data stream of an audio system in a default mode according to the present disclosure.
Figure 5:
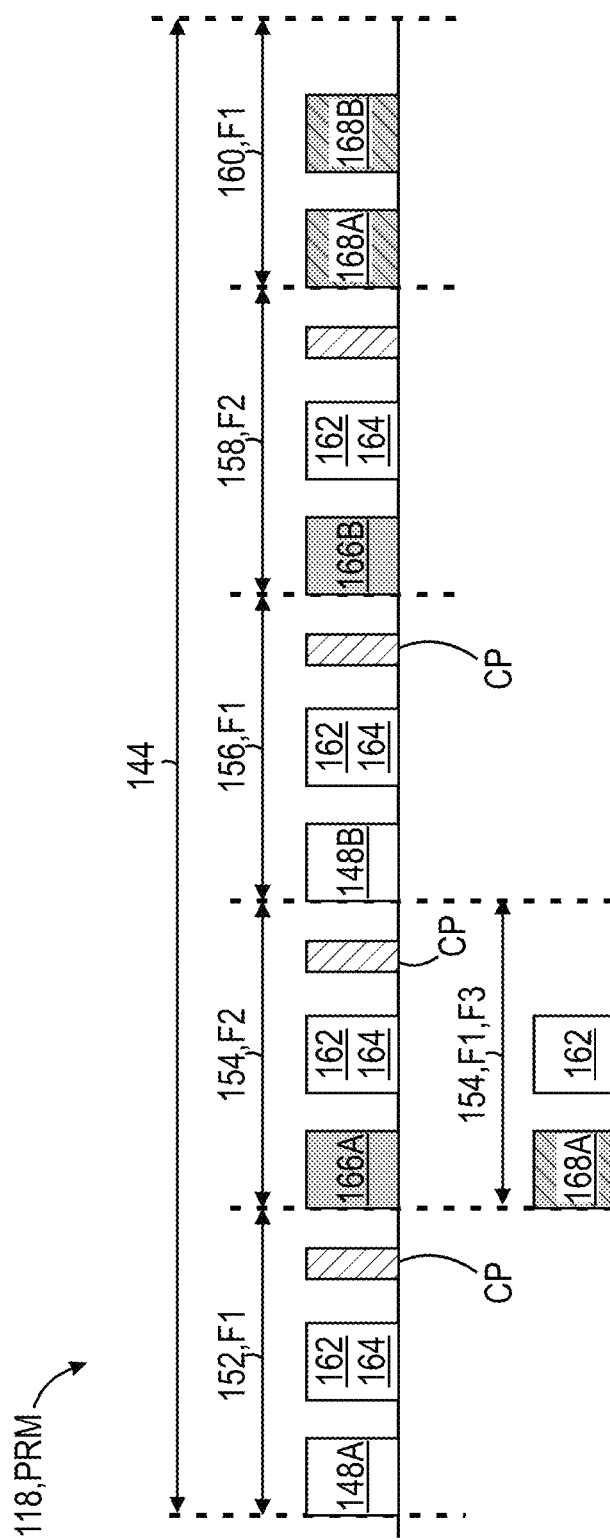
FIG. 5 illustrates a schematic view of an isochronous data stream of an audio system in a partial retransmission mode according to the present disclosure.
Figure 6:
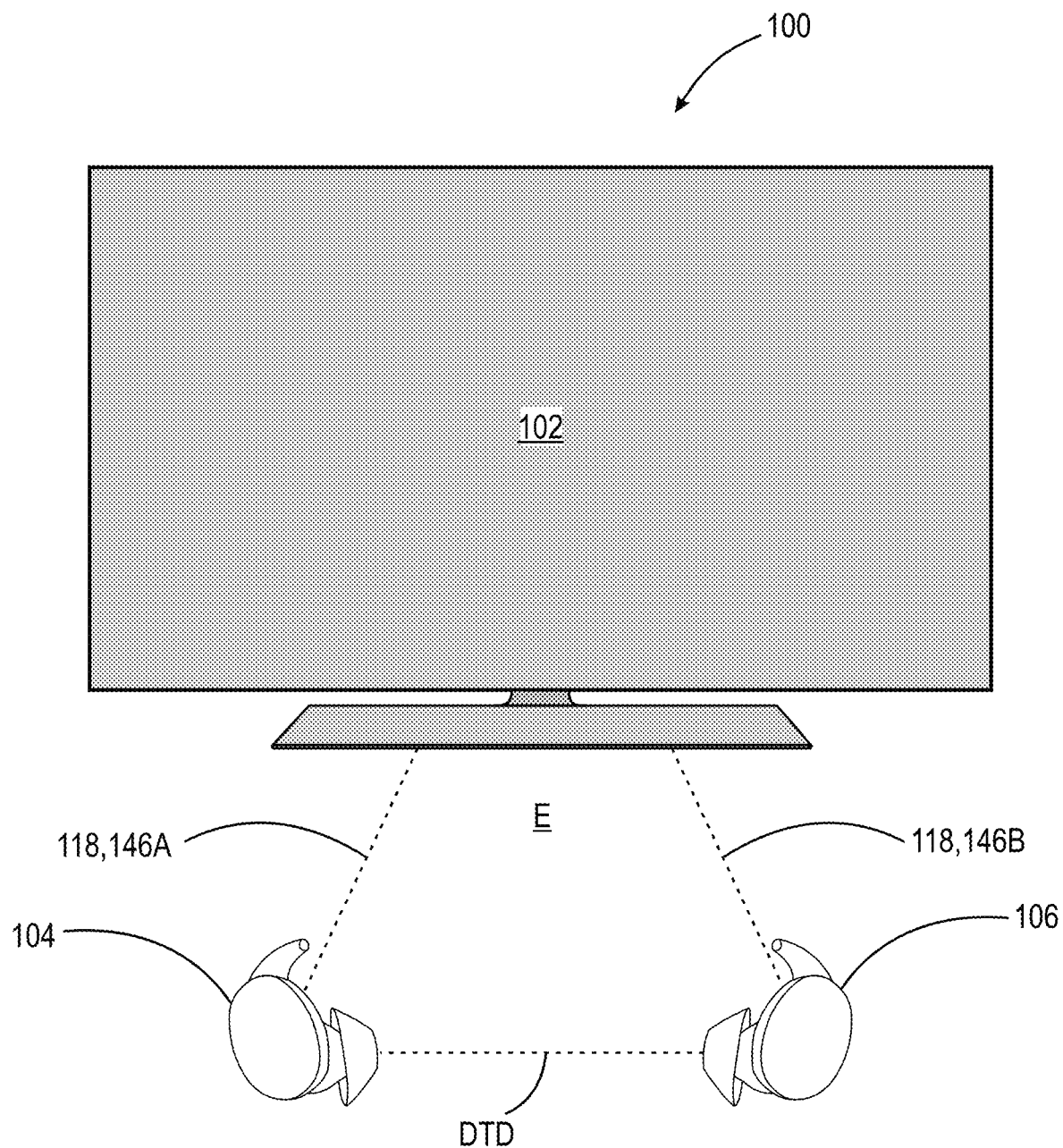
FIG. 6 illustrates a schematic view of an audio system according to the present disclosure

The following description should be read in view of FIGS. 1-9. FIG. 1 is a schematic view of audio system 100 according to the present disclosure. Audio system 100 includes a source device 102 configured to produce an isochronous data stream 118 (discussed below) within an environment E. Source device 102 is intended to be a wired or wireless audio device capable of sending and/or receiving data related to isochronous data stream 118 between source device 102 and at least one audio device, e.g., first audio device 104. In one example, as illustrated in FIG. 1, source device 102 is a smart phone capable of sending isochronous data stream 118 to at least one audio device, e.g., first audio device 104. In one example, as illustrated in FIG. 6, source device 102 is a smart television capable of sending or broadcasting isochronous data stream 118 to at least one audio device, e.g., first audio device 104. Although not illustrated, it should be appreciated that source device 102 can also be selected from at least one of: a personal computer, tablet, smart speaker, smart speaker system, smart hub, or any other device capable of sending or receiving isochronous data stream 118.

Figure 2:
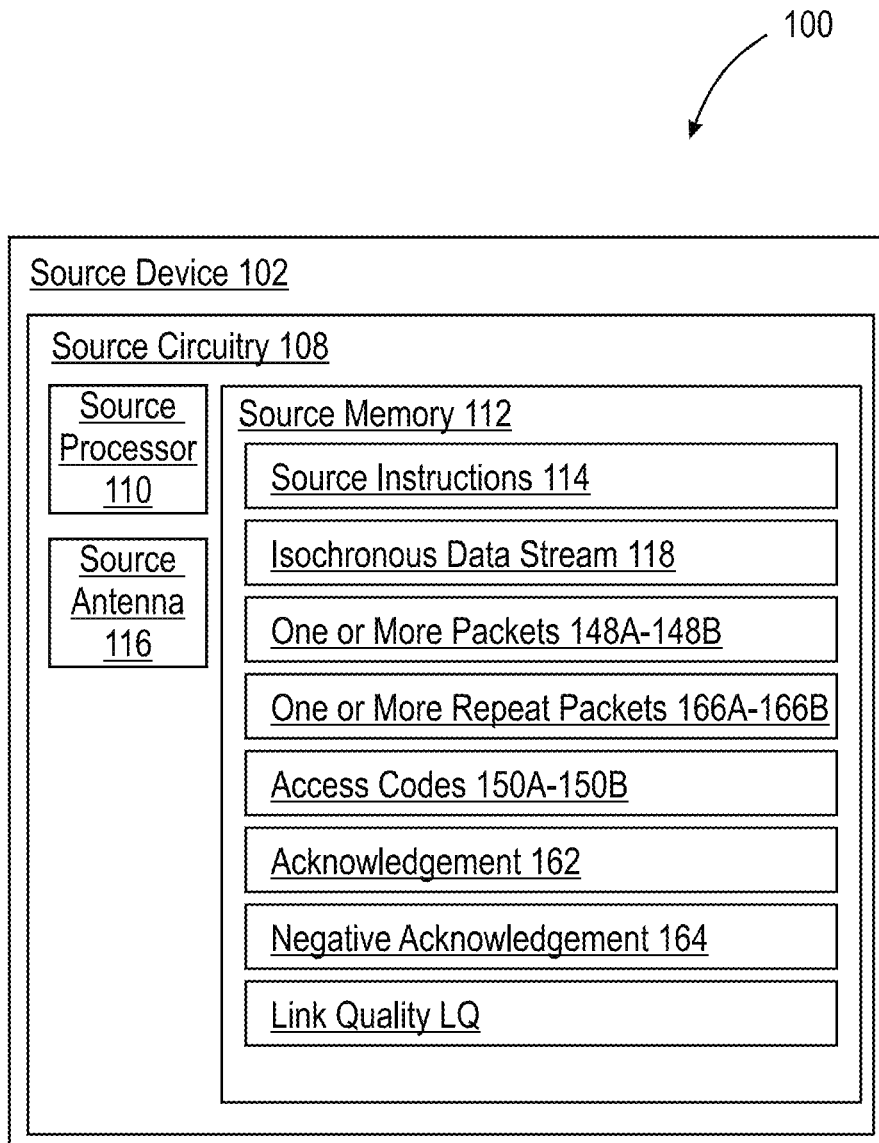
FIG. 2 illustrates a schematic view of a source device according to the present disclosure.
Figure 3:
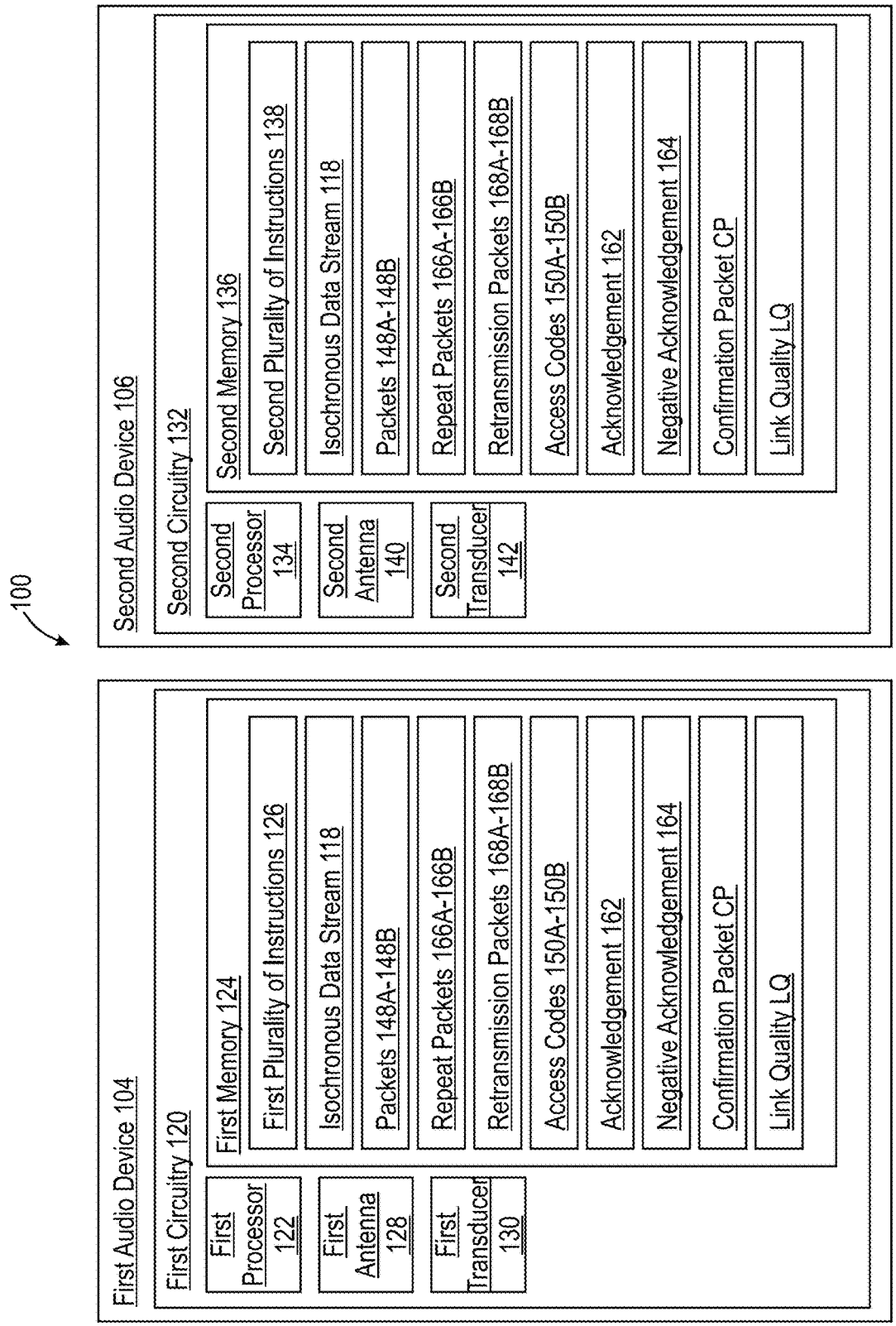
FIG. 3A illustrates a schematic view of a first audio device according to the present disclosure.
FIG. 3B illustrates a schematic view of a second audio device according to the present disclosure.

As illustrated in FIG. 2, source device 102 includes source circuitry 108. Source circuitry 108 includes a source processor 110 and source memory 112 configured to execute and store, respectively, a plurality of non-transitory computer readable source instructions 114 to perform the various functions of source device 102 and source circuitry 108 discussed herein. It should be appreciated that although not illustrated, source circuitry 108 can further include a power interface arranged to obtain power from a mains power supply or from a battery, capacitor, super capacitor, or other power supply electrically connected to source device 102. Source circuitry 108 further includes a source antenna 116 configured to send and/or receive isochronous data stream 118. Although source antenna 116 is intended to be a single antenna, it should be appreciated that one or more source antennas can be provided within or connected to source device 102.

In one example, audio system 100 also includes at least one audio device, e.g., first audio device 104. First audio device 104 is intended to be a device configured to receive isochronous data stream 118 where at least a portion of isochronous data stream 118 includes an audio data stream, e.g., first audio stream 146A (discussed below). First audio device 104 is configured to receive an audio signal from the audio data stream and generate or render audible sound via a transducer, e.g., first transducer 130 (shown in FIG. 3A). In one example, first audio device 104 is intended to be a wearable audio device, e.g., a wireless wearable audio device. In one example, first audio device 104 is intended to be a truly wireless earbud capable of receiving at least a portion of isochronous data stream 118 from source device 102 and rendering sound associated with first audio stream 146A. It should be appreciated that first audio device 104 can also be configured to receive and transmit isochronous data stream 118 without rendering sound related to an audio data stream. In one example, first audio device 104 is a hub device arranged to receive isochronous data stream 118 and generate an audio signal which is transmitted to an additional device having a transducer which renders the audio signal into an audible sound within environment E.

In another example, as illustrated in FIGS. 1 and 3A-3B audio system 100 includes a plurality of audio devices, e.g., first audio device 104 and second audio device 106, where first audio device 104 and second audio device 106 are intended to be devices configured to receive isochronous data stream 118 where at least a portion of isochronous data stream 118 corresponds with a first audio stream, e.g., first audio stream 146A (discussed below), and at least a portion of isochronous data stream 118 corresponds with a second audio stream, e.g., second audio stream 146B (discussed below). It should be appreciated that, during operation of audio system 100, first audio stream 146A and second audio stream 146B can utilize the LC3 audio codec discussed above to compress the audio data contained within each stream. First audio device 104 is configured to receive at least the first audio stream 146A and generate or render audible sound via first transducer 130 (shown in FIG. 3A). Second audio device 106 is configured to receive at least the second audio stream 146B and generate or render audible sound via a second transducer 142 (shown in FIG. 3B). As discussed below in detail, in one example implementation, first audio device 104, in addition to being configured to receive at least a portion of the first audio stream 146A, is also configured to receive at least a portion of the second audio stream 146B. Similarly, second audio device 106, in addition to being configured to receive at least a portion of the second audio stream 146B, is also configured to receive at least a portion of the first audio stream. 146A. In one example, first audio device 104 and second audio device 106 are intended to be wearable audio devices, e.g., wireless wearable audio devices. In one example, first audio device 104 and second audio device 106 are intended to be a pair of truly wireless earbuds capable of receiving at least a portion of isochronous data stream 118 from source device 102. In one example, first audio device 104 is a right-ear headphone and second audio device 106 is a left-ear headphone, and first audio stream 146A and second audio stream 146B are right-designated and left-designate audio streams, respectively. Moreover, as illustrated in FIGS. 1 and 6, first audio device 104 and second audio device 106 are configured to establish a communication connection between each other, e.g., a device-to-device connection DTD. This device-to-device DTD connection can be bidirectional, e.g., where each audio device sends and receives communications from the other device, or may be one-way or unidirectional in that only one of the two devices may be sending communication data and only one of the devices may be receiving communication data at any given time. It should be appreciated that this device-to-device connection DTD can be utilized by first audio device 104 and second audio device 106 to send various packets, e.g., the one or more retransmission packets 168 (discussed below), between each audio device.

FIG. 3A schematically illustrates the components of first audio device 104. As illustrated first audio device 104 further includes first circuitry 120. First circuitry 120 includes a first processor 122 and first memory 124 configured to execute and store, respectively, a first plurality of non-transitory computer readable instructions 126 to perform the various functions of first audio device 104 and first circuitry 120 discussed herein. It should be appreciated that although not illustrated, first circuitry 120 can further include a power interface arranged to obtain power from, for example, a battery, capacitor, super capacitor, or other power supply electrically connected to first audio device 104. First circuitry 120 further includes a first antenna 128 configured to send and/or receive at least a portion of isochronous data stream 118 from, e.g., source antenna 116 of source device 102. Although first antenna 128 is intended to be a single antenna, it should be appreciated that one or more antennas can be provided within or connected to first audio device 104. First circuitry 120 also includes a first transducer 130 or other electromechanical component electrically connected to first processor 122 and first memory 124 and configured to render an electronic signal, e.g., an audio signal, into audible sound.

Similarly, as illustrated in FIG. 3B, second audio device 106 further includes second circuitry 132. Second circuitry 132 includes a second processor 134 and second memory 136 configured to execute and store, respectively, a second plurality of non-transitory computer readable instructions 138 to perform the various functions of second audio device 106 and second circuitry 132 discussed herein. It should be appreciated that although not illustrated, second circuitry 132 can further include a power interface arranged to obtain power from, for example, a battery, capacitor, super capacitor, or other power supply electrically connected to second audio device 106. Second circuitry 132 further includes a second antenna 140 configured to send and/or receive at least a portion of isochronous data stream 118 from, e.g., source antenna 116 of source device 102. Although second antenna 140 is intended to be a single antenna, it should be appreciated that one or more antennas can be provided within or connected to second audio device 106. Second circuitry 132 also includes a second transducer 142 or other electromechanical component electrically connected to second processor 134 and second memory 136 and configured to render an electronic signal, e.g., an audio signal, into audible sound.

As will be discussed throughout the present disclosure, audio system 100 is configured to measure link quality data between each device within audio system 100, e.g., between source device 102 and first audio device 104, between source device 102 and second audio device 106, and in some examples, between first audio device 104 and second audio device 106. The link quality data is utilized by the audio system 100 to determine a link quality LQ (shown in FIGS. 2-3B) between each device. The link quality data can include a determination of a signal strength related to the sending and/or receiving of any of the packets that will discussed below (e.g., one or more packets 148A-148B, one or more repeat packets 166A-166B, and/or one or more retransmission packets 168A-168B). For example, the link quality data can indicate a high link quality which corresponds with a high signal strength, e.g., a signal strength greater than a predetermined threshold value; or, a low link quality which corresponds with a low signal strength, e.g., a signal strength less than a predetermine threshold value. Additionally, link quality LQ can be determined based on a failure to receive a predetermined number of packets. For example, a high link quality can correspond to the respective devices acknowledging receipt of packets, e.g., receipt of first packet 148A or a first repeat packet 166A (discussed below). Conversely, a low link quality can correspond to the respective devices failing to acknowledge receipt of the first packet 148A or first repeat packet 166A (discussed below). Furthermore, link quality LQ can be determined a based on number of acknowledgements 162 (discussed below) or negative acknowledgments 164 (discussed below) received within a predetermined amount of time. As will be discussed below in detail, the link quality LQ between devices in audio system 100 can determine the operational mode within which audio system 100 operates.

Figure 7:
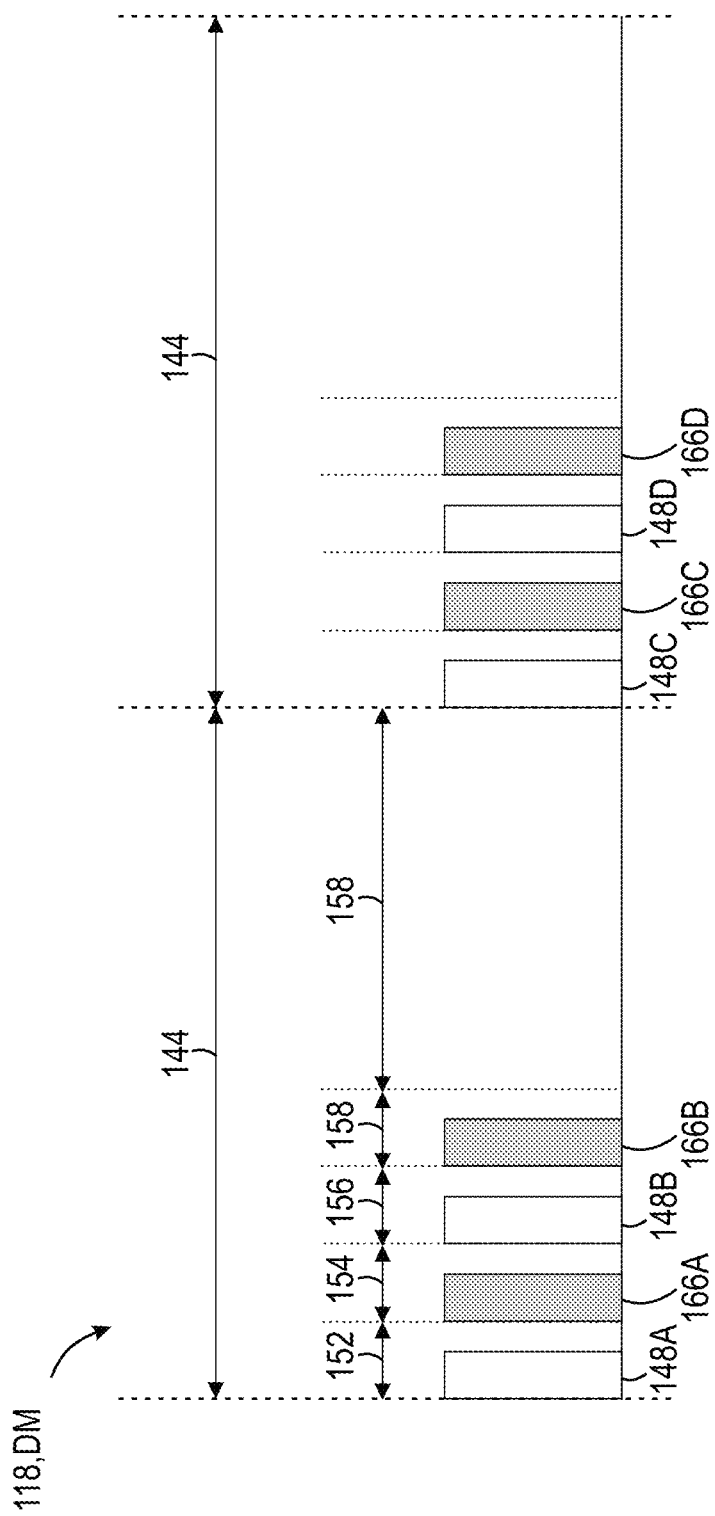
FIG. 7 illustrates a schematic view of an isochronous data stream of an audio system in a default mode according to the present disclosure.
Figure 8:
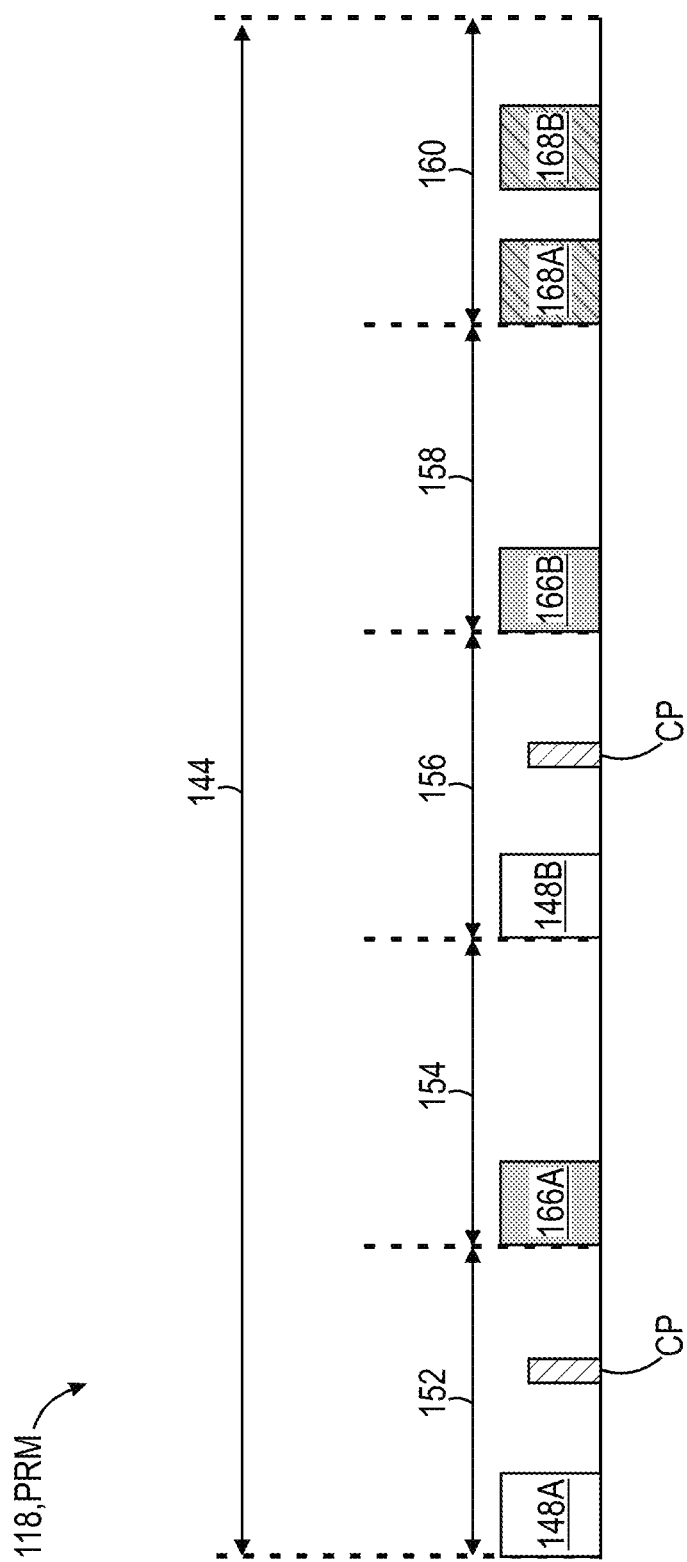
FIG. 8 illustrates a schematic view of an isochronous data stream of an audio system in a partial retransmission mode according to the present disclosure.

As discussed above, first audio device 104 and second audio device 106 are configured to receive an isochronous data stream 118. Isochronous Data Stream 118 can be a connected isochronous stream using LE Audio as illustrated in FIGS. 4 and 5, or a broadcast isochronous stream using LE Audio as illustrated in FIGS. 7 and 8. In one example, as illustrated in FIGS. 4 and 5, isochronous audio data stream 118 is a connected isochronous stream which uses a LE Audio or Bluetooth Low-Energy (BLE or LE) data protocol. The term "connected isochronous stream" as used herein, in addition to including its ordinary meaning or its meaning known to those skilled in the art, is intended to refer to an isochronous data stream which utilizes a preestablished, point-to-point communication link over LE Audio between, e.g., source device 102 and each audio device, e.g., first audio device 104 or second audio device 106. In other words, a connected isochronous stream can provide isochronous audio stream 118 within environment E which utilizes established reliable communication channels between the source device and the respective audio devices. It should be appreciated that, in one example, isochronous audio stream 118 can be a connected isochronous stream which utilizes LE Audio and the LC3 audio codec to compress audio data as discussed above. It should also be appreciated that the connected isochronous stream discussed herein is not limited to comprising audio data and can include other types of data, e.g., sensor data. It should be appreciated that in other examples, isochronous audio data stream 118 can utilize various data protocols or methods of transmission e.g., Radio Frequency (RF) communication protocols, WiFi protocols, Near-Field Magnetic Inductance (NFMI) communications, LE Asynchronous Connection (LE ACL) logical transport protocols, or any other method of transmission of wireless data suitable for sending and/or receiving audio data streams, e.g., first audio stream 146A or second audio stream 146B. As will be discussed below in detail, isochronous audio data stream 118 is a data stream generated by source device 102 and is configured to send wireless data at regularly occurring, even time intervals, e.g., isochronous interval 144. Each isochronous interval 144 defines a time interval within which one or more pieces of data, e.g., a packet, can be sent by source device 102. In one example, as illustrated in FIGS. 4 and 5, isochronous interval 144 is intended to define a time interval between 0-40 ms, e.g., 7.5 ms, 10 ms, 20 ms or 30 ms. It should be appreciated that FIGS. 4 and 5 illustrate isochronous intervals 144 over time, where progression from left to right within the figure, corresponds with proceeding forward in time.

As illustrated in FIGS. 4 and 5, source antenna 116 of source device 102 is configured to generate isochronous audio data stream 118 which includes data related to a plurality of audio streams 146A-146B (shown schematically in FIG. 1). Isochronous audio data stream 118 includes data relating to a first audio stream 146A and a second audio stream 146B. In one example, first audio stream 146A corresponds to a right-ear audio data stream, e.g., an audio data stream meant to be generated or rendered proximate a user's right ear. Similarly, second audio stream 146B corresponds to a left-ear audio data stream, e.g., an audio data stream meant to be generated or rendered proximate a user's left ear. It should be appreciated that isochronous audio data stream 118 is configured such that, within a single isochronous interval 144, a plurality of packets of data are sent, e.g., one or more packets 148A-148B, where a first packet 148A corresponds with first audio stream 146A (e.g., right-ear audio data) and a second packet 148B corresponds with second audio stream 146B (e.g., left-ear audio data). In one example, first packet 148A is the first packet in a series of packets that define first audio stream 146A, and second packet 148B is the first packet in a series of packets that define second audio stream 146B. Thus, first audio device 104 is configured to receive at least first packet 148A and second audio device 106 is configured to receive at least second packet 148B. Once each audio device has received all respective packets within each series, first audio device 104 can render sound or sounds corresponding to first audio stream 146A and second audio device 106 can render sound or sounds corresponding to second audio stream 146B. As will be described below, in one example, second audio device 106 can be arranged to eavesdrop and/or monitor over the device-to-device connection DTD discussed above, whether first circuitry 120 of first audio device 104 has received first packet 148A and similarly, first audio device 104 can be arranged to eavesdrop and/or monitor whether second circuitry 132 has received second packet 148B and each device can be configured to receive both first packet 148A and second packet 148B and can be arranged to send or transmit each respective packet to each respective device using device-to-device connection DTD.

Within each packet of the one or more packets 148A-148B, each packet contains at least a portion of data utilized as an access code which identifies or denotes that each respective packet is intended to be received and rendered by a particular device. For example, first memory 124 of first audio device 104 can include a first access code 150A specific to first audio device 104. Additionally, second memory 136 of second audio device 106 can include a second access code 150B different than the first access code 150A, that is specific to second audio device 106. It should be appreciated that each access code discussed above may be preprogrammed into each device or may be assigned to each audio stream or device at run time and may be the same or different each instance the audio stream or device is set up or initialized. At least a portion of the data structure of the one or more packets 148A-148B corresponding to the packets in each series of packets that defines first audio stream 146A and second audio stream 146B, respectively, include one access code, e.g., either first access code 150A or second access code 150B. In one example, first packet 148A corresponding to first audio stream 146A includes within its data structure first access code 150A. As first memory 124 of first audio device 104 includes first access code 150A, first audio device 104 can utilize the data in first packet 148A to render audio related to first audio stream 146A. Conversely, second packet 148B corresponding to second audio stream 146B includes within its data structure second access code 150B. As second memory 136 of second audio device 106 includes second access code 150B, second audio device 106 can utilize the data in second packet 148B to render audio related to second audio stream 146B. In one example, as will be discussed below, first audio device 104 and second audio device 106 can exchange, in a preliminary communication, e.g., over device-to-device connection DTD, both first access code 150A and second access code 150B such that each device can identify first packet 148A and second packet 148B.

As illustrated in FIGS. 4 and 5, source device 102 is configured to send or broadcast isochronous data stream 118 in isochronous intervals 144. Each isochronous interval 144 includes a plurality of subintervals. For example, FIG. 5, which illustrates a connected isochronous stream, shows that isochronous interval 144 includes a first subinterval 152, a second sub interval 156, and a marginal subinterval 160. In some examples, isochronous interval 144 further includes a first repeat subinterval 154 and a second repeat subinterval 158. Within first subinterval 152, source device 102 is configured to transmit, broadcast, or otherwise send first packet 148A corresponding with the first packet of the series of packets that comprise first audio stream 146A. In one example, isochronous interval 144 includes first subinterval 152, first repeat subinterval 154, second subinterval 156, second repeat subinterval 158, and marginal subinterval 160, where each respective subinterval 152-160 are arranged sequentially within isochronous audio data stream 118 in the order illustrated.

As illustrated, the time necessary to transmit first packet 148A utilizes only a portion of first subinterval 152 and the remaining time within first subinterval 152 corresponds with a predetermined waiting time period where the source device 102 waits to receive an acknowledgement (ACK) 162 indicating that, e.g., first audio device 104 has received first packet 148A or a negative acknowledgement (NACK) 164 indicating that, e.g., first audio device 104 has not received first packet 148A. It should be appreciated that during first subinterval 152, source device 102 and/or first audio device 104 are configured to send and/or receive first packet 148A using a first frequency F1 or first frequency channel. It should be appreciated that isochronous audio data stream 118 and/or source device 102 and first audio device 104 can utilize any frequency or channel for first frequency F1 of the active channels or frequencies in an agreed upon or negotiated channel map. In one example, isochronous audio data stream 118 is a connected isochronous stream which utilizes an LE Audio or Bluetooth Low-Energy protocol and the first frequency F1 corresponds with a frequency of 2.404 Ghz or a first frequency channel; however, it should be appreciated that first frequency F1 can be selected from any channel or frequency provided in the negotiated or agreed upon channel map of available channels between source device 102 and first audio device 104.

Similarly, during the second subinterval 156, the time necessary to transmit second packet 148B utilizes only a portion of second subinterval 156 and the remaining time within second subinterval 156 corresponds with a predetermined waiting time period where the source device 102 waits to receive an acknowledgement (ACK) 162 indicating that, e.g., second audio device 106 has received second packet 148B or a negative acknowledgement (NACK) 164 indicating that, e.g., second audio device 106 has not received second packet 148B. It should be appreciated that during second subinterval 156, source device 102 and/or second audio device 106 are configured to send and/or receive second packet 148B using the first frequency F1 or first frequency channel. In one example, isochronous audio data stream 118 is a connected isochronous stream which utilizes an LE Audio or Bluetooth Low-Energy protocol and the first frequency F1 corresponds with a frequency of 2.404 Ghz or a first frequency channel.

In one example, if either first device 104 or second device 106 indicate that first packet 148A or second packet 148B were not received during the first subinterval 152 and second subinterval 156, respectively, isochronous audio data stream 118 can utilize first repeat subinterval 154 and second repeat subinterval 158, respectively, to transmit one or more repeat packets 166A-166B to first audio device 104 and second wireless audio device 106, respectively. For example, isochronous audio data stream 118 includes a first repeat subinterval 154 arranged after the first subinterval 152 and before second subinterval 156. Should first audio device 104 indicate a failure to receive first packet 148A within first subinterval 152, e.g., via acknowledgement 162 or via a negative acknowledgement 164, source device 102 is configured to send a first repeat packet 166A during first repeat subinterval 154, where first repeat packet 166A is a copy of first packet 148A and corresponds with first audio stream 146A. Thus, first repeat subinterval 154 operates to resend a copy of first packet 148A in the form of first repeat packet 166A to increase the likelihood that first audio device 104 receives the first packet of the series of packets that comprise first audio stream 146A. Furthermore, isochronous audio data stream 118 includes a second repeat subinterval 158 arranged after the second subinterval 156 and before marginal subinterval 160. Should second audio device 106 indicate a failure to receive second packet 148B within second subinterval 156, e.g., via acknowledgement 162 or via a negative acknowledgement 164, source device 102 is configured to send a second repeat packet 166B during second repeat subinterval 158, where second repeat packet 166B is a copy of second packet 148B and corresponds with second audio stream 146B. Thus, second repeat subinterval 158 operates to resend a copy of second packet 148B in the form of second repeat packet 166B to increase the likelihood that second audio device 106 receives the second packet of the series of packets that comprise second audio stream 146B.

It should be appreciated that during first repeat subinterval 154, source device 102 and/or first audio device 104 are configured to send and/or receive first repeat packet 166A using a second frequency F2 or second frequency channel where the second frequency F2 is different than the first frequency F1. In one example, isochronous audio data stream 118 is a connected isochronous stream which utilizes a Bluetooth Low-Energy protocol and the second frequency F2 corresponds with a frequency of 2.428 Ghz or a second frequency channel. Similarly, during second repeat subinterval 158, source device 102 and/or second audio device 106 are configured to send and/or receive second repeat packet 166B using a second frequency F2 or second frequency channel where the second frequency F2 is different than the first frequency F1. As discussed above with respect to first frequency F1, it should be appreciated that isochronous audio data stream 118 and/or source device 102 and first audio device 104 can utilize any frequency or channel for second frequency F2 of the active channels or frequencies in an agreed upon or negotiated channel map. It should be understood that the selection of active channels or frequencies can be based on a selection algorithm, e.g., a channel selection algorithm (CSA). In one example, isochronous audio data stream 118 is a connected isochronous stream which utilizes a Bluetooth Low-Energy protocol and the second frequency F2 corresponds with a frequency of 2.428 Ghz or a second frequency channel; however, it should be appreciated that second frequency F2 can be selected from any channel or frequency provided in the negotiated or agreed upon channel map of available channels between source device 102 and first audio device 104. It should also be appreciated that, each subinterval discussed above, as well as marginal subinterval 160 discussed below, may utilize a unique frequency or channel of the negotiated or agreed upon channel map between source device 102 and first audio device 104. For example, first subinterval 152 may utilize first frequency F1, first repeat subinterval 154 can utilize second frequency F2, second subinterval 156 can utilize a third frequency F3, second repeat subinterval 158 can utilize a fourth frequency F4, and marginal subinterval 160 can utilize a fifth frequency F5, where each frequency F1-F5 is unique.

Additionally, as illustrated in FIG. 5, after first subinterval 152, first repeat subinterval 154, second subinterval 156, and second repeat subinterval 158, a marginal interval 160 is provided. In examples which do not include second repeat subinterval 158, marginal subinterval 160 defines the remaining time within isochronous interval 144 after the second subinterval 156. Alternatively, in examples which include second repeat subinterval 158, marginal subinterval 160 defines the remaining time within isochronous interval 144 after the second repeat subinterval 158.

As discussed above, first circuitry 120 of first audio device 104 can store in first memory 124 a first access code 150A which aids in the identification of one or more packets of isochronous audio data stream 118. For example, first access code 150A can aid in identifying first packet 148A from within isochronous audio data stream 118. Additionally, second circuitry 132 of second audio device 106 can store in second memory 136 a second access code 150B which aids in the identification of second packet 148B from within isochronous audio data stream 118. However, it should be appreciated that first circuitry 120 can share first access code 150A with second audio device 106 e.g., over device-to-device connection DTD, and second audio device 106 can store first access code in second memory 136. Conversely, second circuitry 132 can share second access code 150B with first audio device 104, e.g., over device-to-device connection DTD, and first audio device 104 can store second access code 150B in first memory 124. Thus, both first audio device 104 and second audio device 106 can receive and identify both first packet 148A and second packet 148B. In one example, as each device, i.e., first audio device 104 and second audio device 106, can receive and identify first packet 148A and second packet 148B, first audio device 104 can transmit or send and acknowledgement, e.g., acknowledgement 162, to source device 102 indicating receipt of first packet 148A and second packet 148B. Similarly, as second audio device 106 can receive and identify first packet 148A and second packet 148B, second audio device can transmit or send and acknowledgement, e.g., acknowledgement 162, to source device 102 indicating receipt of first packet 148A and second packet 148B. In other words, each audio device, i.e., first audio device 104 and second audio device 106, can acknowledge receipt of the packets meant for themselves as well as acknowledge the packets meant for the other audio device on behalf of that audio device. It should be appreciated that each audio device can also send a negative acknowledgement, e.g., negative acknowledgement 164, to source device 102 indicating a failure of one or both devices to receive a given packet of the one or more packets 148A-148B.

Furthermore, in the event that one audio device fails to receive one or more packets 148A-148B, and the other audio device successfully receives the one or more packets 148A-148B, the device that successfully receives the packet can send a confirmation packet CP to the device that failed to receive the one or more packets 148A-148B so that the audio device that failed to receive the packets can send an acknowledgement to source device 102 on its own behalf rather than having the other audio device acknowledge on its behalf. For example, should first audio device 104 fail to receive first packet 148A, and second audio device 106 successfully receives first packet 148A, second audio device 106 can, within first subinterval 152, send or transmit a confirmation packet CP from second audio device 106 to first audio device 104 using device-to-device connection DTD, indicating to first audio device 104 that second audio device 106 has successfully received first packet 148A. First audio device 104, having confirmed via the confirmation packet CP that second device 106 has successfully obtained or received first packet 148A can acknowledge on its own behalf that first packet 148A was successfully received and await a retransmission packet (discussed below) from second audio device 106.

In the event that first packet 148A is received by first circuitry 120 of first audio device 104 within first subinterval 152, first audio device 104 can send an acknowledgement, e.g., acknowledgement 162, to source device 102 and/or second audio device 106 indicating that first packet 148A was successfully received, and no further action is needed. In the event first packet 148A is not received by first audio device 104, but is received by second audio device 106, e.g., where first audio device 104 fails to send acknowledgement 162 or sends a negative acknowledgement 164 during first subinterval 152, second audio device 106 can send an acknowledgement 162 on behalf of first audio device 104 within the predetermined waiting period of second subinterval 154, i.e., the remaining time within second subinterval 154. Should second audio device 106 confirm receipt of first packet 148A and in the event first audio device 104 fails to acknowledge receipt of first packet 148A, second audio device 106 can send one or more retransmission packets 168A-168B directly to first audio device 104 during first repeat subinterval 154 or during marginal subinterval 160, using device-to-device connection DTD. It should be appreciated that second audio device 106 can send one or more retransmission packets 168A-168B during the same time interval that the source device 102 sends the one or more repeat packets 166A-166B to the first audio device 104, e.g., during the first repeat subinterval 154 or second repeat subinterval 158. In one example, once the first retransmission packets 168A has been successfully received by the first audio device 104 during the first repeat subinterval 154, either the first audio device 104 or the second audio device 106 can send an acknowledgment 162 to source device 102. It should further be appreciated that if the second audio device 106 sends the one or more retransmission packets 168A-168B to first audio device 104 during the first repeat subinterval 154, the one or more retransmission packets 168A-168B can be sent at a the first frequency F1, or a third frequency F3 different than the second frequency F2 and the first frequency F1 to avoid interference with the sending and receiving of the one or more repeat packets 166A-166B sent at the second frequency F2. It should be appreciated that in the alternative to using alternate frequencies, e.g., first frequency F1, second frequency F2, and/or third frequency F3, to send the one or more retransmission packets 168A-168B, first audio device 104 and second audio device 106 can establish a separate communication channel directly between first circuitry 120 and second circuitry 132 using a dedicated channel or protocol, e.g., a dedicated connection using Near Field Magnetic Inductance (NFMI) or an LE Asynchronous Connection (LE ACL) logical transport protocol. It should be appreciated that in the event first audio device 104 and second audio device 106 establish a separate communication channel using LE ACL, this connection can still utilize frequency hopping, e.g., switching frequency channels of the available frequencies or channels in the agreed upon or negotiated channel map, and may utilize the same or different frequencies as discussed above.

It should be appreciated that confirmation packet CP is intended to be a packet sent within each respective subinterval so that at least one of the audio devices can confirm successful receipt of the packets discussed herein. It should also be appreciated that rather than sending a confirmation packet CP in the remaining time within each subinterval, audio system 100 can be configured to, within that same time interval, send one of the retransmission packets 168A-168B described herein rather than a confirmation packet CP.

It should also be appreciated that audio system 100 can be configured such that, should first audio device 104 acknowledge receipt of first packet 148A, on its own behalf during first subinterval 152, source device 102 can receive the acknowledgement and automatically begin sending the second packet 148B during the next available subinterval. Similarly, should second audio device 106 acknowledge receipt of second packet 148B during second subinterval 156 on its own behalf, source device 102 can receive the acknowledgement and automatically shift to the marginal subinterval 160. In other words, should either audio device acknowledge receipt of one or more packets 148A-148B, source device 102 can determine that it is not necessary to utilize first repeat subinterval 154 or second repeat subinterval 158 to send one or more repeat packets 166A-166B, and can skip to the next required operation. This skipping of the repeat subintervals can operate to save power in each respective audio device during receipt of the isochronous data stream 118. Furthermore, in the event that an acknowledgement 162 is received between the first subinterval 152 and the second repeat subinterval 158 that both the first packet 148A and second packet 148B have been successfully received by each audio device, first audio device 104 and second audio device 106 can be configured to ignore or detune their respective antennas during marginal subinterval 160 to further save power.

Additionally, in one example embodiment, each packet, i.e., first packet 148A, second packet 148B, first repeat packet 166A, second repeat packet 166B, first retransmission packet 168A, and second retransmission packet 168B, can be configured to include an appended portion of data to the packet data structures which would allow the devices within audio system 100 to employ forward error correction techniques or algorithms and attempt to recover missing packets prior to acknowledging or failing to acknowledge receipt of each packet.

Audio system 100 is configured to operate in one of three operational modes: a default mode DM, a partial retransmission mode PRM, or a total retransmission mode. The default mode DM corresponds to an operational mode where packets of data are broadcast from the source device 102 within environment E and certain packets of the one or more packets 148A-148F are configured to be received by first audio device 104 and second audio device 106, respectively. As illustrated in FIG. 4, which illustrates a default mode DM operation of audio system 100 that utilizes isochronous data stream 118 as a connected isochronous stream over LE Audio, within default mode DM, source device 102 is configured to produce isochronous data stream 118 that sends a single packet, e.g., first packet 148A, waits for an acknowledgement that first audio device 104 has received first packet 148A and then sends a second packet 148B and waits for an acknowledgement that second audio device 106 has received the second packet. After each instance in which the respective audio devices fail to acknowledge receipt of a packet, e.g., after a negative acknowledgement 164 or a missing acknowledgement (illustrated with dotted lines in FIG. 4), source device 102 can send a certain number of repeat packets 166A-166F within each subinterval. Should the respective audio devices acknowledge receipt of their respective packets upon the first attempt, as shown with first packet 148A and packet 148E, no repeat packet is necessary. As illustrated, it should be appreciated that after a certain number of failed attempts, e.g., if the respective audio devices continue to fail to receive the repeat packets, source device 102 simply stops attempting to send repeat packets and data is lost. In this default mode, access codes 150A-150B are not shared between devices and therefore, each audio device simply identifies only the packets meant for each device, e.g., that are associated with first audio stream 146A and second audio stream 146B. Additionally, within this default mode DM, each audio device can only acknowledge receipt of its own packets, e.g., first audio device 104 can only acknowledge first packet 148A or any packet associated with first audio stream 146A.

Partial retransmission mode PRM corresponds to an operational mode of audio system 100 where first audio device 104 and/or second audio device 106 can selectably decide to provide one or more retransmission packets, e.g., one or more retransmission packets 168A-168B to the other audio device, using device-to-device connection DTD, in the event that one of the audio devices confirms receipt of a packet and the other does not. Importantly, within the partial retransmission mode PRM, both audio devices, i.e., first audio device 104 and second audio device 106, can exchange access codes, e.g., first access code 150A and second access code 150B, such that first circuitry 120 and second circuitry 132 can receive and identify first packet 148A and second packet 148B. As each audio device has the access code of the other, each audio device can acknowledge receipt of each packet on behalf of each audio device or on behalf of the other audio device. Should one audio device receive a packet meant for the other, the device that successfully received the one or more packets can provide the other device with one or more retransmission packets 168A-168B. For example, as illustrated in FIG. 5, which illustrates audio system 100 in a partial retransmission mode PRM that utilizes isochronous data stream 118 as a connected isochronous stream, source device 102 is configured to produce isochronous data stream 118 which sends a first packet 148A within a first subinterval 152 of an isochronous interval 144. Within first subinterval 152 source device 102 sends first packet 148A at a first frequency F1. During first subinterval 152, source device 102 awaits an acknowledgement from first audio device 104 indicating that the first audio device 104 has received first packet 148A. As illustrated, it should be appreciated that second audio device 106 can optionally send a confirmation packet CP to first audio device 104, over device-to-device connection DTD, within the remaining time within first subinterval 152 indicating that second audio device 106 has received first packet 148A and first audio device 104 can send an acknowledgement 162 to source device 102. In the event second audio device 106 confirms that second audio device 106 has successfully received first packet 148A and first audio device 104 has not, source device 102 can broadcast a first repeat packet 166A (e.g., where first repeat packet 166A is a copy of first packet 148A) during a first repeat subinterval 154 after first subinterval 152, where first repeat packet 166A is sent using a second frequency F2 different than first frequency F1. Simultaneously, i.e., during first repeat subinterval 154, second audio device 106 can optionally attempt to send a retransmission packet, e.g., first retransmission packet 168A, to first audio device 104 at a different frequency than the source device 102 uses to send the first repeat packet 166A, e.g., second audio device 106 can utilize a new frequency, i.e., a third frequency F3 different than first frequency F1 or second frequency F2, or second audio device can utilize the first frequency F1 while source device 102 utilizes second frequency F2. In this way, by ensuring that the frequencies used to send first repeat packet 166A and first retransmission packet 168A are different, interference between the sending or receiving of first repeat packet 166A and first retransmission packet 168A is minimized and the likelihood of first audio device 104 receiving first repeat packet 166A and first retransmission packet 168A is maximized.

It should be appreciated that, in the partial retransmission mode PRM, if the first audio device 104 or second audio device 106 fail to acknowledge receipt of first packet 148A, via acknowledgement 162, or in the event that first audio device 104 or second audio device 106 provide a negative acknowledgment 164 indicating that neither first audio device 104 nor the second audio device 106 received first packet 148A, source device 102 is configured to provide a repeat packet, e.g., first repeat packet 166A within first repeat time interval 154. It should also be appreciated that a similar retransmission scheme can be utilized to send second packet 148B, second repeat packet 166B and/or second retransmission packet 168B from first audio device 104 to second audio device 106 in the event that first audio device 104 receives second packet 148B and second audio device 106 does not.

In the alternative to, or in addition to, the retransmission schemes provided above for first retransmission packet 168A and second retransmission packet 168B, in the partial retransmission mode PRM, the first retransmission packet 168A and second retransmission packet 168B can be sent from one audio device to the other using device-to-device connection DTD during the marginal subinterval 160. For example, should first audio device 104 fail to acknowledge receipt of first repeat packet 166A or first retransmission packet 168A during the first repeat subinterval 154, second audio device 106 can retransmit first retransmission packet 168A to first audio device 104 during the marginal subinterval 160. It should be appreciated that in the event second audio device 106 fails to confirm receipt of second repeat packet 166B or second retransmission packet 168B during the second repeat subinterval 158, first audio device 104 can retransmit second retransmission packet 168B to second audio device 106 during the marginal subinterval 160.

Although not illustrated, it should be appreciated that audio system 100 is further configured to operate in a total retransmission mode. The total retransmission mode corresponds to an operational mode of audio system 100 where either first audio device 104 or second audio device 106 is configured to receive the one or more packets 148A-148B and/or configured to receive the one or more repeat packets 166A-166B, and forward all relevant packets to the other audio device directly using device-to-device connection DTD. Importantly, within the total retransmission mode, one audio device, e.g., first audio device 104 obtains both access codes, e.g., first access code 150A and second access code 150B such that first circuitry 120 can receive and identify first packet 148A and second packet 148B. In this example, first audio device 104 can acknowledge receipt of second packet 148B on behalf of second audio device 106. As first audio device 104 is receiving the one or more packets 148A-148B and/or the one or more repeat packets 166A-166B, the first audio device 104 provides second packet 148B and/or second repeat packet 148B to second audio device directly, via a separate connection, e.g., via a predetermined frequency or channel (determined by the agreed upon or negotiated channel map for each device) or through a dedicated connection, e.g., established using Near Field Magnetic Inductance (NFMI) communication or LE Asynchronous Connection (LE ACL) logical transport protocols. Alternatively, or additionally, first audio device 104 can provide the relevant data to second audio device 106 using only the one or more retransmission packets, e.g., second retransmission packet 168B and any of the foregoing packets related to second audio stream 146B can be send from first audio device 104 to second audio device during any of the subintervals, repeat subintervals, or marginal subintervals discussed above. It should be appreciated that whether first audio device 104 is configured to retransmit all relevant packets to second audio device 106 or whether second audio device 106 is configured to retransmit all relevant packets to first audio device 104 can be determined based on link quality between each audio device and source device 102. For example, if the link quality LQ between first audio device 104 and source device 102 is low, then second audio device 106 can receive and retransmit the packets related to first audio stream 146A to first audio device 104. Conversely, if the link quality LQ between second audio device 106 and source device 102 is low, then first audio device 104 can receive and retransmit the packets related to second audio stream 146B to second audio device 106.

As discussed above, audio system 100 can operate in one of three operational modes: default mode DM, partial retransmission mode PRM, and a total retransmission mode (not shown). It should be appreciated that audio system 100 can be configured to enter at least one of these operational modes automatically upon a triggering event or trigger (not shown). As discussed above, audio system 100 is configured to obtain link quality information pertaining to the link quality LQ between each device of audio system 100. For example, the devices in audio system 100 discussed above, can determine whether there is a high link quality or a low link quality between each device, for example, by sending test packets, or measuring responses to the sending and receiving of the packets discussed above. Should the link quality LQ between two devices be lacking or otherwise indicate a low link quality, while the link quality between the other devices is more robust or otherwise indicative of high link quality, audio system 100 can switch between the three modes discussed herein to improve the likelihood of all devices receiving the relevant packets. For example, should the link quality LQ between second audio device 106 and source device 102 be low or otherwise poor, audio system 100 recognizes the low quality connection as a triggering event or trigger, and can switch audio system 100 from default mode DM, e.g., to partial retransmission mode PRM, so that any packets not received by second audio device 106 due to the poor connection can be retransmitted, e.g., via second retransmission packet 168B from first audio device 104 to second audio device 106, selectably. Alternatively, upon a trigger indicating low link quality between second device 106 and source device 102, audio system 100 can switch into total retransmission mode (not shown) where all packets are received by first audio device 104 and retransmitted, via a dedicated connection, to second audio device 106.

The determination to switch from default mode DM to either partial retransmission mode PRM or total retransmission mode (not shown) can be further aided by measuring the link quality LQ between first audio device 104 and second audio device 106. For example, if the link quality LQ between first audio device 104 and source device 102 is high, the link quality LQ between the second audio device 106 and source device 102 is low, and the link quality LQ between first audio device 104 and second audio device 106 is high, then audio system 100 can switch into either partial retransmission mode PRM or total retransmission mode (not shown) where some or all of the packets received by first audio device 104 are retransmitted via the dedicated link between first audio device 104 and second audio device 106.

Furthermore, in addition to the link quality LQ discussed above exceeding or failing to exceed predetermined threshold values (e.g., high and low), the trigger or triggering event can also include a user generated input, i.e., a user input (not shown). The user input can include a signal generated from one or more sensors located on, in, or in proximity to the first audio device 104, the second audio device 106, and/or source device 102. In one example, the one or more sensors can be selected from at least one of: a button, a touch-capacitive sensor, a touch-screen sensor a proximity sensor, a gyroscope, an accelerometer, a magnetometer, a microphone, or a camera. It should also be appreciated that link quality LQ can be determined using additional inputs. For example, link quality LQ can be derived from an exchange of statistical link information between the devices of audio system 100, e.g., the number of channels within the negotiated or agreed upon channel map that have been blacklisted for a certain connection or link, the retransmit count of the number of retransmission packets sent between any two devices in audio system 100, the amount of negative acknowledgements (e.g., the number of packets that had but errors), and the number of missed events (e.g., the number of packets not received to an inability to lock or use the access codes discussed above).

The trigger can also be based on the first audio device 104 or the second audio device 106 failing to receive a threshold number or amount of packets. The trigger can also be the second audio device 106 receiving a packet request from the first audio device 104. Furthermore, the trigger can be based on a discrepancy based on eavesdropping on the first audio device 104's ACKs/NACKs (e.g., seeing a threshold number of NACKs in a given time period from the first audio device 104 to the source device 102 or a threshold number of NACKs in a row); a sensor input (e.g., the audio system 100 automatically switches modes based on the location of the first audio device 104, the second audio device 106, or the source device 102. For example if any of the devices of audio system 100 acknowledges that the location it is in will be a challenged Radio Frequency space, such as a user's workplace or a highly congested area). The trigger can also include the number of blacklisted channels in the channel map rising above a predetermined threshold, the number of retransmission packets sent between any two devices rising above a predetermined threshold, and the number of missed events rising above a predetermined threshold.

During operation audio system 100 can determine that the link quality LQ between first audio device 104 and source device 102 is low, the link quality LQ between second audio device 106 and source device 102 is high, and the link quality LQ between first audio device 104 and second audio device 106 is high. This arrangement results in a trigger or triggering event causing audio system 100 to switch from a default mode DM to, e.g., a partial retransmission mode PRM. In the partial retransmission mode PRM, first audio device 104 and second audio device 106 can exchange access codes, e.g., first access code 150A and second access code 150B, so that each audio device can identify the packets associated with the first audio stream 146A and the second audio stream 146B. In the partial retransmission mode PRM, source device 102 is configured to produce an isochronous data stream 118 which is a connected isochronous stream which utilizes a Bluetooth Low-Energy (BLE) protocol. Within isochronous data stream 118, and during a first subinterval 152, source device 102 is configured to transmit a first packet 148A at a first frequency F1, where the first packet 148A corresponds to a first audio stream 146A associated with the first audio device 104. As the link quality LQ between source device 102 and first audio device 104 is low, it is likely that first circuitry 120 of first audio device 104 will fail to receive first packet 148A within first subinterval 152. Conversely, as the link quality LQ between second audio device 106 and source device 102 is high, it is likely that second circuitry 132 of second audio device 106 will receive first packet 148A during the first subinterval 152. As second audio device 106 has received first packet 148A, second audio device 106 can send a confirmation packet CP to first audio device 102 during the remaining time within first subinterval 152. As first audio device 104 has not yet received first packet 148A, isochronous data stream 118 can proceed to a first repeat subinterval 154. During first repeat subinterval 154, source device 102 is configured to send a first repeat packet 166A which is a copy of first packet 148A at a second frequency F2 different than the first frequency F1. Simultaneously, second audio device 106 is configured to send a first retransmission packet 168A to first audio device 104 at first frequency F1 such that the sending and receiving of the first repeat packet 166A and the first retransmission packet 168A do not generate wireless interference. First audio device 104 can acknowledge, via acknowledgment 162, that either the first repeat packet 166A or the first retransmission packet 168A was received during the first repeat subinterval 154. Isochronous data stream 118 proceeds to second subinterval 156, where source device 102 is configured to send a second packet 148B at a first frequency F1. As the link quality LQ between source device 102 and second audio device 106 is high, it is likely that second circuitry 132 of second audio device 106 will receive second packet 148B within second subinterval 156. In the event that first audio device 104 fails to acknowledge receipt of first repeat packet 166A or first retransmission packet 168A during the first repeat subinterval 154, second audio device 106 can send an additional retransmission packet 168A to first audio device 104 during the marginal subinterval 160. Once both first packet 148A and second packet 148B have been received, this process is repeated until the there are enough packets associated with the first audio stream 146A and the second audio stream 146B stored in the respective memories of the respective audio devices that each audio data stream can be rendered via, e.g., first transducer 130 and second transducer 142 and into the user's ears.

In another example operation audio system 100 can determine that the link quality LQ between first audio device 104 and source device 102 is low, the link quality LQ between second audio device 106 and source device 102 is high, and the link quality LQ between first audio device 104 and second audio device 106 is high. This arrangement results in a trigger or triggering event causing audio system 100 to switch from a default mode DM to, e.g., total retransmission mode. In the total retransmission mode (not shown), first audio device 104 and second audio device 106 can exchange access codes, e.g., first access code 150A and second access code 150B so that one audio device, e.g., second audio device 106, can identify the packets associated with the first audio stream 146A and the second audio stream 146B. In the total retransmission mode, source device 102 is configured to produce an isochronous data stream 118 which is a connected isochronous stream which utilizes a Bluetooth Low-Energy (BLE) protocol. Within isochronous data stream 118, and during a first subinterval 152, source device 102 is configured to transmit a first packet 148A at a first frequency F1, where the first packet 148A corresponds to a first audio stream 146A associated with the first audio device 104. As the link quality between source device 102 and first audio device 104 is low, audio system 100 is configured such that all packets will be received and acknowledged by second audio device 106 and the relevant packets, e.g., the packets related to first audio stream 146A, will be forwarded or retransmitted from second audio device 106 to first audio device 104 directly, via device-to-device connection DTD. Once both first packet 148A and second packet 148B have been received by each respective audio device, this process is repeated until there are enough packets associated with the first audio stream 146A and the second audio stream 146B stored in the respective memories of the respective audio devices that each audio data stream can be rendered via, e.g., first transducer 130 and second transducer 142 and into the user's ear.

As illustrated in FIGS. 7 and 8 Isochronous Data Stream 118 can also be a Broadcast Isochronous Stream which utilizes a LE Audio or Bluetooth Low-Energy (BLE) protocol. The term "broadcast isochronous stream" as used herein, in addition to including its ordinary meaning or its meaning known to those skilled in the art, is intended to refer to an isochronous data stream which does not require a preestablished communications link to be established between the source device sending data and the audio device receiving data and does not require acknowledgements or negative acknowledgements to be sent or received. Instead, multiple copies of each packet are sent automatically to increase the likelihood that each audio device will receive their respective packets. In other words, a broadcast isochronous stream can broadcast an isochronous audio stream within environment E without establishing a reliable communication channel between the source device and the audio device and instead simply provides additional instances of each packet to increase likelihood of receipt. It should also be appreciated that the broadcast isochronous stream discussed herein is not limited to comprising audio data and can include other types of data, e.g., sensor data.

As illustrated in FIG. 7, which illustrates audio system 100 as a broadcast isochronous stream over LE Audio in the default mode DM, isochronous data stream 118 includes isochronous intervals 144, where the isochronous intervals 144 include a first subinterval 152, a first repeat subinterval 154, second subinterval 156, second repeat subinterval 158, and a marginal subinterval 160. In the default mode DM, isochronous audio stream 118 is configured to send first packet 148A during first subinterval 152 and first repeat packet 166A within first repeat subinterval 154. In the default mode DM, first audio device 104 is not configured to acknowledge successful receipt of first packet 148A within first subinterval 152. Rather, source device 102 is configured to send repeat packet 166A within first repeat interval 166A without an acknowledgement from first audio device 104. Similarly, within default mode DM, source device 102 is configured to send second packet 148B within second subinterval 156 and second repeat packet 166B within second repeat subinterval 158, regardless of any acknowledgement by second audio device 106.

As illustrated in FIG. 8, which illustrates audio system 100 as a broadcast isochronous stream over LE Audio in the partial retransmission mode PRM, isochronous data stream 118 includes isochronous intervals 144, having the same subinterval structure described above, e.g., a first subinterval 152, a first repeat subinterval 154, a second subinterval 156, a second repeat subinterval 158, and a marginal subinterval 160. However, as described above, first audio device 104 and second audio device 106 are configured to exchange access codes 150A-150B such that each audio device can eavesdrop or otherwise monitor and/or receive the packets directed to each respective audio device over device-to-device connection DTD and retransmit any failed packets from each audio device within certain subintervals. For example, in the partial retransmission mode PRM, in the event that first audio device 104 fails to receive first packet 148A sent using a first frequency F1, and second audio device 106, which is eavesdropping and/or monitoring the packets sent and/or received by first audio device 104, successfully receives first packet 148A during first subinterval 152, second audio device 106 can send a confirmation packet CP to first audio device 104 during first subinterval 152 indicating that the second audio device 106 successfully received first packet 148A. Similar to the examples described above, during the first repeat subinterval 154, source device 102 can send a repeat packet 166A to first audio device 104 at a second frequency F2 and the second audio device 106 can send first retransmission packet 168A to first audio device 104 at the first frequency F1 (or a third frequency F3 different than first frequency F1 and second frequency F2) to minimize interference. It should be appreciated that second audio device 106 can also be configured to send first retransmission packet 168A during marginal subinterval 160 over the device-to-device connection DTD (shown in FIG. 6). Similar retransmission schemes can be employed during the second subinterval 156 and the second repeat subinterval 158 should second audio device 106 fail to receive second packet 148B and first audio device 104 successfully receives second packet 148B. It should be appreciated that the retransmission techniques described above can be combined in any conceivable way within each same isochronous interval in any given operational mode.

Additionally, audio system 100 can be configured to operate in a total retransmission mode where isochronous data stream 118 is a broadcast isochronous stream over LE Audio. Isochronous data stream 118 includes isochronous intervals 144, having the same subinterval structure described above, e.g., a first subinterval 152, a first repeat subinterval 154, a second subinterval 156, a second repeat subinterval 158, and a marginal subinterval 160. However, as described above, neither first audio device 104 or second audio device 106 is configured to acknowledge receipt of any of the packets sent by source device 102 within isochronous data stream 118. Additionally, within total retransmission mode, first audio device 104 and second audio device 106 are configured to exchange access codes 150A-150B such that one of the audio devices can eavesdrop or otherwise monitor and/or receive the packets directed to the other audio device and is configured to forward or retransmit all relevant packets, e.g., the packets related to the other audio device's audio stream, directly. For example, if the link quality between source device 102 and first audio device 104 is low, audio system 100, within total retransmission mode, is configured such that all packets will be received by second audio device 106 and the relevant packets, e.g., the packets related to first audio stream 146A, will be forwarded or retransmitted from second audio device 106 to first audio device 104 directly. Once both first packet 148A and second packet 148B this process is repeated until the there are enough packets associated with the first audio stream 146A and the second audio stream 146B stored in the respective memories of the respective audio devices that each audio data stream can be rendered via, e.g., first transducer 130 and second transducer 142 and into the user's ear.

Figure 9:
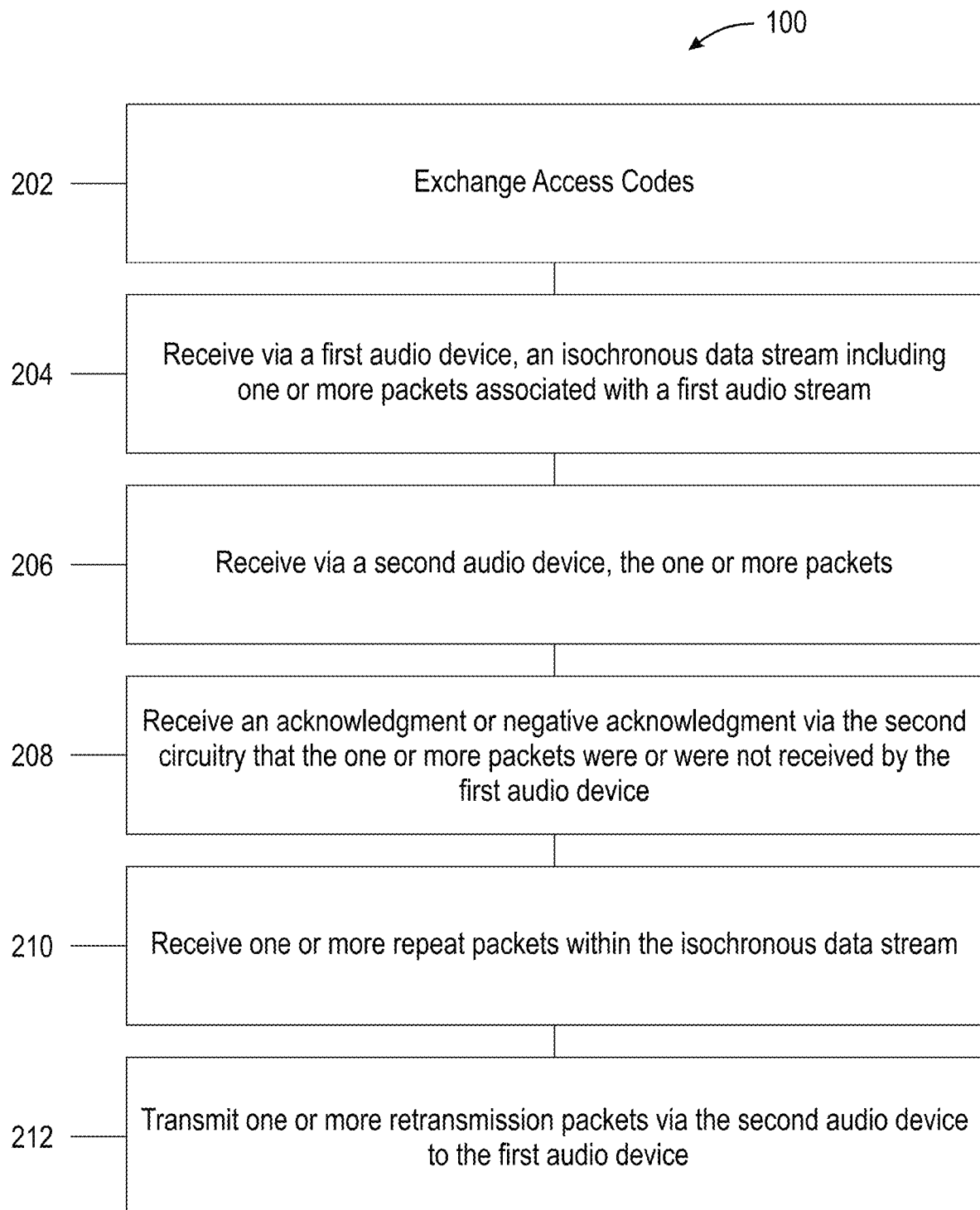
FIG. 9 is a flow chart illustrating an example method according to the present disclosure.

FIG. 9 illustrates an example method for audio retransmission, e.g., method 200. Method 200 includes, for example: receiving the access code via the first circuitry of the first audio device and the second circuitry of the second audio device (step 202); receiving, via first circuitry 120 of a first audio device 104, at least a portion of an isochronous data stream 118 from a source device 102, the isochronous data stream 118 including a first audio stream 146A associated with the first audio device 104 (step 204); receiving, via second circuitry 132 of a second audio device 106, the one or more packets 148A of the first audio stream 146A from the isochronous data stream 118 (step 206); receiving, via the second circuitry 132 of the second audio device 106, an acknowledgment 162 during a first subinterval 152 of the isochronous data stream 118 to indicate that a first packet 148A of the one or more packets was received by the first circuitry 120 of the first audio device 104; or, receiving, via the second circuitry 132 of the second audio device 106, a negative acknowledgement 164 during the first subinterval 152 of the isochronous data stream 118 to indicate that the first packet 148A was not received by the first circuitry 120 of the first audio device 106 (step 208). Optionally, at step 210, audio system 100 is configured to send one or more repeat packets 166A-166B during a first repeat subinterval 154 and/or a second repeat subinterval 158 to further ensure receipt of the packets where the one or more repeat packets 166A-166B are copies of first packet 148A and second packet 168B respectively. Additionally, method 200 also includes transmitting one or more retransmission packets 168A, via the second circuitry 132 of the second audio device 106, to the first circuitry 120 of the first audio device 104, wherein the one or more retransmission packets 168A are based on the one or more packets 148A (step 212) wherein the a first retransmission packet 168A of the one or more retransmission packets is transmitted to the first circuitry 120 of the first audio device 104 during a marginal subinterval 160 of the isochronous data stream 118, the first retransmission packet 168A being a copy of the first packet 148A, if the second circuitry 132 receives the negative acknowledgment 164 indicating that the first packet 148A was not received by the first circuitry 120 of the first audio device 104. Moreover, the source device 102 can be configured to transmit the first packet 148A at a first frequency F1 during the first subinterval 152.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function (s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. An audio system comprising:
   a first audio device configured to wirelessly receive at least a portion of an isochronous data stream from a source device, the isochronous data stream including a first audio stream configured to be rendered by the first audio device;
   a second audio device configured to selectably receive one or more packets of the first audio stream from the source device via the isochronous data stream; and
   wherein the second audio device is arranged to wirelessly transmit one or more retransmission packets to the first audio device, the one or more retransmission packets based on the one or more packets of the first audio stream that the second audio device selectably received from the source device via the isochronous stream.

2. The audio system of claim 1, wherein the second audio device is arranged to monitor if the first audio device receives the first packet, and, if the first audio device does not receive the first packet, the second audio device is arranged to wirelessly transmit the one or more retransmission packets to the first audio device.

3. The audio system of claim 2, wherein the second audio device is configured to acknowledge or receive an acknowledgment during a first subinterval of the isochronous data stream that indicates that a first packet of the one or more packets was received by the first audio device; or, the second audio device is configured to acknowledge or receive a negative acknowledgement during the first subinterval of the isochronous data stream that indicates that the first packet was not received by the first audio device.

4. The audio system of claim 3, wherein if the second audio device receives a negative acknowledgment indicating that the first packet was not received by the first audio device, the second audio device is further configured to transmit a first retransmission packet of the one or more retransmission packets to the first audio device during a marginal subinterval of the isochronous data stream, the first retransmission packet being a copy of the first packet.

5. The audio system of claim 3, wherein the isochronous data stream includes the first subinterval and a first repeat subinterval after the first subinterval, wherein during the first subinterval the source device is configured to transmit the first packet at a first frequency and during the first repeat subinterval the source device is arranged to transmit a first repeat packet associated with the first packet at a second frequency and the second audio device is arranged to transmit a first retransmission packet of the one or more retransmission packets to the first audio device at the first frequency or at a third frequency different than the first frequency and the second frequency.

6. The audio system of claim 1, wherein the first audio device and the second audio device are configured to receive and render the at least a portion of the isochronous data stream from the source device, the isochronous data stream further comprising a second packet of the one or more packets of the first audio stream associated with the second audio device, wherein the first audio device is arranged to monitor if the second audio device receives the second packet, and, if the second audio device does not receive the second packet, the first audio device is arranged to transmit a second retransmission of the one or more retransmission packets to the second audio device, the second retransmission packet associated with the second packet.

7. The audio system of claim 6, wherein the first audio device is configured to acknowledge or receive an acknowledgment during a second subinterval of the isochronous data stream that indicates that the second packet was received by of the second audio device; or, the first audio device is configured to acknowledge or receive a negative acknowledgement during the second subinterval of the isochronous data stream that indicates that the second packet was not received by of the second audio device.

8. The audio system of claim 7, wherein if the first audio device receives a negative acknowledgment indicating that the second packet was not received by the second audio device, the first audio device is further configured to transmit the second retransmission packet the second audio device during a marginal subinterval of the isochronous data stream, the second retransmission packet being a copy of the second packet.

9. The audio system of claim 7, wherein the isochronous data stream includes the second subinterval and a second repeat subinterval after the second subinterval, wherein during the second subinterval the source device is configured to transmit the second packet at a first frequency and during the second repeat subinterval the source device is arranged to transmit a second repeat packet associated with the second packet at a second frequency and of the first audio device is arranged to transmit the second retransmission packet to the second audio device at the first frequency or at a third frequency different than the first frequency and the second frequency.

10. The audio system of claim 1, wherein the isochronous data stream is a Broadcast Isochronous Stream or a Connected Isochronous Stream over a Bluetooth Low-Energy protocol.

11. The audio system of claim 1, wherein the one or more retransmission packets are transmitted between the first audio device and the second audio device using Near-Field Magnetic Inductance (NFMI) connection or a Low Energy Asynchronous Connection (LE ACL) logical transport protocol.

12. The audio system of claim 1, wherein the one or more packets include an access code and the first audio device, and the second audio device are arranged to receive the access code.

13. The audio system of claim 1, wherein each of the one or more retransmission packets are encoded with forward error correction data to increase the probability of receipt by the first audio device.

14. The audio system of claim 1, wherein the second audio device is configured to selectably receive a first packet of the one or more packets based at least in part on: (i) a link quality between the first audio device and the source device; (ii) the link quality between the second audio device and the source device; or, (iii) the link quality between the first audio device and the second audio device.

15. A method for audio retransmission, the method comprising:
receiving, via a first audio device, at least a portion of an isochronous data stream from a source device, the isochronous data stream including a first audio stream associated with the first audio device;
receiving, via a second audio device, the one or more packets of the first audio stream from the source device via the isochronous data stream; and
transmitting one or more retransmission packets, via the second audio device, to the first audio device, the one or more retransmission packets based on the one or more packets of the first audio stream that the second audio device received from the source device via the isochronous stream.

16. The method of claim 15, wherein the transmitting of the one or more retransmission packets, via the second audio device, only occurs if the first audio device does not receive the one or more packets.

17. The method of claim 15 further comprising:
receiving, via the second audio device, an acknowledgment during a first subinterval of the isochronous data stream to indicate that a first packet of the one or more packets was received by the first audio device; or,
receiving, via the second audio device, a negative acknowledgement during the first subinterval of the isochronous data stream to indicate that the first packet was not received by the first circuitry of the first audio device.

18. The method of claim 17 further comprising:
transmitting, via the second audio device, a first retransmission packet of the one or more retransmission packets to the first audio device during a marginal subinterval of the isochronous data stream, the first retransmission packet being a copy of the first packet, if the second audio device receives the negative acknowledgment indicating that the first packet was not received by the first audio device.

19. The method of claim 17, wherein the isochronous data stream includes the first subinterval and a first repeat subinterval after the first subinterval, wherein the first packet is transmitted at a first frequency and during the first subinterval; the source device transmits a first repeat packet associated with the first packet at a second frequency different than the first frequency during the first repeat subinterval; and the second audio device is configured to transmit a first retransmission packet of the one or more retransmission packets to the first audio device at the first frequency or at a third frequency different than the first frequency and the second frequency.

20. The method of claim 15, wherein the isochronous data stream is a Broadcast Isochronous Stream or a Connected Isochronous Stream over a Bluetooth Low-Energy protocol.

21. The method of claim 15, wherein the one or more retransmission packets are transmitted between the first audio device and the second audio device using Near-Field Magnetic Inductance (NFMI) connection or a Low Energy Asynchronous Connection (LE ACL) logical transport protocol.

22. The method of claim 15, wherein the one or more packet includes an access code, the method further comprising:
receiving the access code via the first audio device and the second audio device.

23. The method of claim 15, wherein the one or more retransmission packets are encoded with forward error correction data to ensure receipt by the first audio device.

24. The method of claim 15, wherein the second audio device is configured to selectably receive a first packet of the one or more packets based at least in part on: (i) a link quality between the first audio device and the source device; (ii) the link quality between the second audio device and the source device; or, (iii) the link quality between the first audio device and the second audio device.

\* \* \* \* \*